(12) United States Patent
Huang

(10) Patent No.: US 12,033,394 B2
(45) Date of Patent: Jul. 9, 2024

(54) AUTOMATIC ROBOTIC LAWN MOWING BOUNDARY DETECTION USING 3D SEMANTIC SEGMENTATION

(71) Applicant: Midea Group Co., Ltd., Foshan (CN)

(72) Inventor: Ke Huang, San Jose, CA (US)

(73) Assignee: MIDEA GROUP CO., LTD., Foshan (CN)

( * ) Notice: Subject to any disclaimer, the term of this patent is extended or adjusted under 35 U.S.C. 154(b) by 330 days.

(21) Appl. No.: 17/565,162

(22) Filed: Dec. 29, 2021

(65) Prior Publication Data
US 2023/0206647 A1    Jun. 29, 2023

(51) Int. Cl.
  *G05D 1/00* (2024.01)
  *G06T 7/11* (2017.01)
  (Continued)

(52) U.S. Cl.
  CPC ........... *G06V 20/58* (2022.01); *G05D 1/0214* (2013.01); *G05D 1/0231* (2013.01); *G06T 7/11* (2017.01);
  (Continued)

(58) Field of Classification Search
  CPC .... G06V 20/58; G05D 1/0214; G05D 1/0231; G05D 2201/0208; G05D 1/0246;
  (Continued)

(56) References Cited

U.S. PATENT DOCUMENTS

| | | | |
|---|---|---|---|
| 2017/0200309 A1* | 7/2017 | Qian | G06T 15/04 |
| 2017/0277197 A1* | 9/2017 | Liao | G06T 7/20 |

(Continued)

FOREIGN PATENT DOCUMENTS

| | | |
|---|---|---|
| WO | WO 2019185170 A1 | 10/2019 |
| WO | WO-2020119684 A1 * | 6/2020 |
| WO | WO 2020119684 A1 | 6/2020 |

OTHER PUBLICATIONS

Zhang, A Review of Deep Learning-Based Semantic Segmentation for Point Cloud (Year: 2019).*

(Continued)

*Primary Examiner* — Anne Marie Antonucci
*Assistant Examiner* — Jingli Wang
(74) *Attorney, Agent, or Firm* — Morgan, Lewis & Bockius LLP

(57) ABSTRACT

The method and system disclosed herein presents a method and system for capturing, by a depth-perception device on a mobile robot moving in an environment, depth-perception information at a first location within a portion of the environment. The method includes capturing, by a camera device on the mobile robot, an image frame at the first location within the portion of the environment, generating a three-dimensional point cloud representing the portion of the environment based on the depth-perception information and the image frame, extracting semantic information by providing the frame and the point cloud to a neural network model configured to perform semantic segmentation, associating the semantic information to the three-dimensional point cloud, projecting the three-dimensional point cloud onto a two-dimensional plane to form a first two-dimensional map; and demarcating the first two-dimensional map with a plurality of different regions based on the semantic information.

19 Claims, 18 Drawing Sheets
(10 of 18 Drawing Sheet(s) Filed in Color)

(51) Int. Cl.
  *G06T 7/593* (2017.01)
  *G06T 7/70* (2017.01)
  *G06V 20/58* (2022.01)
(52) U.S. Cl.
  CPC .............. *G06T 7/593* (2017.01); *G06T 7/70* (2017.01); *G06T 2207/10024* (2013.01); *G06T 2207/10028* (2013.01); *G06T 2207/10032* (2013.01); *G06T 2207/20021* (2013.01); *G06T 2207/20084* (2013.01); *G06T 2207/20092* (2013.01)
(58) Field of Classification Search
  CPC ........ G05D 1/027; G05D 1/0274; G06T 7/11; G06T 7/593; G06T 7/70; G06T 2207/10024; G06T 2207/10028; G06T 2207/10032; G06T 2207/20021; G06T 2207/20084; G06T 2207/20092
  See application file for complete search history.

(56) References Cited

U.S. PATENT DOCUMENTS

| | | | |
|---|---|---|---|
| 2018/0236665 A1* | 8/2018 | Takahashi | B25J 9/1697 |
| 2018/0275277 A1* | 9/2018 | Li | G01S 17/89 |
| 2020/0089251 A1 | 3/2020 | Golestan Irani | |
| 2020/0229344 A1* | 7/2020 | Du | G05D 1/0246 |
| 2021/0043002 A1* | 2/2021 | Zeng | G06T 7/74 |
| 2021/0063578 A1* | 3/2021 | Wekel | G01S 7/481 |
| 2022/0027675 A1* | 1/2022 | Sheu | G06F 18/2148 |

OTHER PUBLICATIONS

Machine Translation WO 2020119684 (Year: 2020).*
Midea Group Co., Ltd., ISRWO, PCT/IB2022/061951, Feb. 27, 2023, 7 pgs.

* cited by examiner

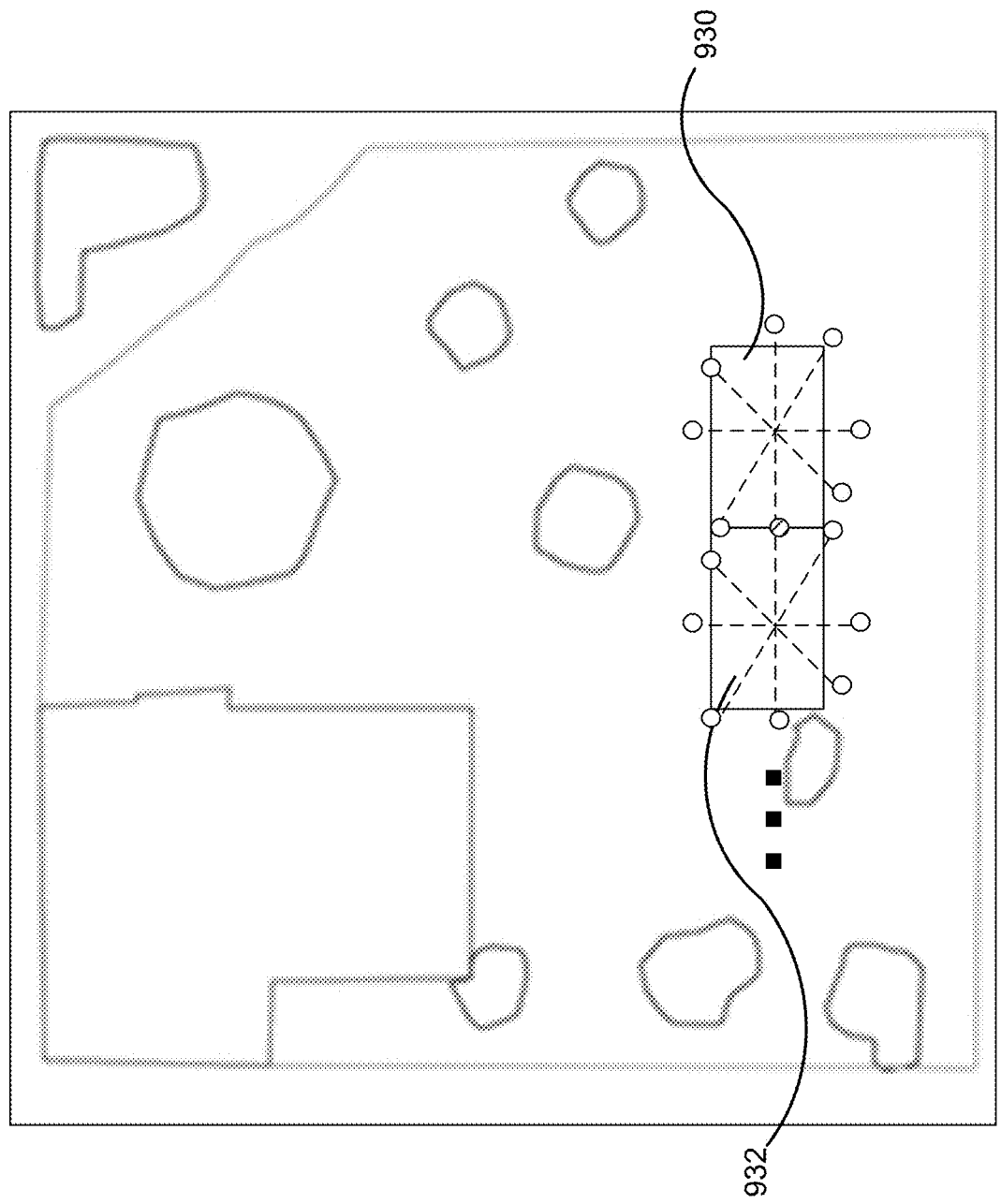

AUTOMATIC ROBOTIC LAWN MOWING BOUNDARY DETECTION USING 3D SEMANTIC SEGMENTATION

FIELD OF THE TECHNOLOGY

The present disclosure generally relates to the technology of detecting a boundary of a workspace of a mobile robot and establishing a semantic map of the workspace using multimodal sensing capabilities of the mobile robot.

BACKGROUND OF THE TECHNOLOGY

Localization, place recognition, and environment understanding are key capabilities to enable a mobile robot to become a fully autonomous or semi-autonomous system in an environment. Methods that build a map of an environment allow the mobile robot to map out unknown environments and localize itself in the environment to carry out tasks such as path planning and obstacle avoidance.

SUMMARY

A mobile robotic lawn mower uses a boundary of a mowing region (e.g., a lawn) to restrict its workspace. The methods and systems described herein obviate the need for installing wires around the mowing area to define the mowing boundary, reducing the associated manpower and training needs for wire installation. Moreover, the wire can be damaged by the mower or small animals (e.g., rodents), and a single damage may cause the robotic mower to stop working in a manner that the mower cannot be self-recovered. The methods and systems describe herein use less setup time and does not require a user of the mower to be well-trained, in comparison to alternative virtual boundary solutions that involve a user guiding the robotic mower while it travels along the mowing boundary concurrently as its trajectory is recorded. Unlike the virtual boundary solutions, the methods and systems described herein do not requires significant setup time even for large lawn, adapts to changes of the layout and reduces (e.g., eliminates) the need to redo the boundary teaching process, does not require continuous accurate localization data, and does not require any additional devices (e.g., handles or control pads).

As disclosed herein, one solution relies on an automatic or semi-automatic method to detect the mowing boundary and establish a semantic map of the mowing area using multimodal sensing. The multimodal sensors include one or more of: an RGB camera, a depth-perception device (e.g., stereo cameras, time of flight (ToF) sensors, Lidar, etc.), localization modules (e.g., Real-time kinematic positioning global positioning system (RTK GPS), ultra-wideband (UWB), and Light Detection and Ranging simultaneous localization and mapping (LiDAR SLAM) at sufficient accuracy and update rate), and an inertial measurement unit (IMU). This method combines the outputs from one or more of these sensors to accurately identify a boundary of a workspace (e.g., a mowing boundary, a mowing boundary of a lawn) and relative to other zones (e.g., driveways, sidewalks, swimming pools, and permanent obstacles such as trees, bushes, rocks, and/or other unknown types). An automated area exploration method allows the mowing boundary detection and mapping to be a fully-automated process.

The methods and systems described herein dramatically reduce the setup work required from human operators of the mobile robots—minimum guidance or no guidance is needed from the user. In some embodiments, the exploration and mowing tasks are combined, allowing a mobile mower robot to begin an automatic mowing task out of the box. The methods and systems described herein are based on three-dimensional (3D) vision, 3D environment reconstruction and semantic mapping.

According to a first aspect of the present application, a method includes: capturing, by a depth-perception device on a mobile robot moving in an environment, depth-perception information at a first location within a portion of the environment. The method includes capturing, by a camera device on the mobile robot, an image frame at the first location within the portion of the environment, generating a three-dimensional point cloud representing the portion of the environment based on the depth-perception information and the image frame, extracting semantic information by providing the frame and the point cloud to a neural network model configured to perform semantic segmentation, associating the semantic information to the three-dimensional point cloud, projecting the three-dimensional point cloud onto a two-dimensional plane to form a first two-dimensional map; and demarcating the first two-dimensional map with a plurality of different regions based on the semantic information.

In some embodiments, the method includes receiving, from a localization module on the mobile robot, information about a pose of the mobile robot in a world frame. The pose of the mobile robot includes a position of the mobile robot and a heading angle of the mobile robot. The method includes converting the semantic information from a camera frame into the world frame, prior to associating the semantic information to the three-dimensional point cloud.

In some embodiments, capturing the depth-perception information includes using a pair of cameras separated by baseline to capture a synchronized pair of images. In some embodiments, the image frame captured by the camera device is one image of the synchronized pair of images. In some embodiments, the neural network model is a three-dimensional semantic segmentation neural network model that includes a two-dimensional semantic segmentation module and a point-cloud semantic segmentation module. The point-cloud semantic segmentation module is configured to process the three-dimensional point cloud, and wherein the two-dimensional semantic segmentation module is configured to process the image frame.

In some embodiments, the three-dimensional point cloud does not include color or texture information. In some embodiments, the image frame includes color information. In some embodiments, the method includes using a semantic segmentation aggregator to select, for each point in the three-dimensional point cloud, a semantic segmentation result based on an output from the two-dimensional semantic segmentation module or an output from the point-cloud semantic segmentation module.

In some embodiments, projecting the three-dimensional point cloud onto the two-dimensional plane includes projecting a portion of the three-dimensional point cloud within a predefined range of height onto the two-dimensional plane. In some embodiments, the method includes receiving input from a user specifying a portion of a satellite image of the environment that defines a geofence for the mobile robot; and dividing the portion of the satellite image into a plurality of grids.

In some embodiments, the method includes selecting a second location on a frontier of the first two-dimensional map as a subsequent location for the mobile robot; planning a trajectory between the first location and the second location; moving the mobile robot to the second location; and updating the first two-dimensional map.

In some embodiments, demarcating the first two-dimensional map with the plurality of different regions based on the semantic information includes marking the first two-dimensional map with contours to form the plurality of different regions. The contours are for different types of instances extracted from semantic labeling in the semantic information.

In some embodiments, the method further includes determining a boundary based on the plurality of different regions; and in accordance with a determination that mobile robot crosses the boundary: causing the mobile robot to make an emergency stop. In some embodiments, the method includes moving the mobile robot to a second location, distinct from the first location, and generating a second two-dimensional map.

In some embodiments, the second location is on a frontier of the first two-dimensional map, and wherein the method further includes planning a trajectory between the first location and the second location; moving the robot to the second location. In some embodiments, the method includes generating a global index for each point in the three-dimensional point cloud, the global index providing information about world frame coordinates associated with the respective point in the three-dimensional point cloud, red-blue-green (RGB) values associated with the respective point, and a semantic label for the respective point.

In some embodiments, the method includes using the global index to look up points projected onto first two-dimensional map from the three-dimensional point cloud. In some embodiments, the method further includes navigating, by the mobile robot, using the first two-dimensional map; while simultaneously performing a mowing operation, wherein the mobile robot avoids obstacles demarcated in the first two-dimensional map.

According to a second aspect of the present application, an electronic device includes one or more processors, memory and a plurality of programs stored in the memory. The programs include instructions, which when executed by the one or more processors, cause the electronic device to perform the methods described herein.

According to a third aspect of the present application, a non-transitory computer readable storage medium stores a plurality of programs for execution by an electronic apparatus having one or more processors. The programs include instructions, which when executed by the one or more processors, cause the electronic device to perform the methods described herein.

In addition to reducing computation complexity, and improving speed and accuracy of mapping and localization of mobile robots in an environment, as described above, various additional advantages of the disclosed technical solutions are apparent in light of the descriptions below.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The aforementioned features and advantages of the disclosed technology as well as additional features and advantages thereof will be more clearly understood hereinafter as a result of a detailed description of preferred embodiments when taken in conjunction with the drawings.

To describe the technical solutions in the embodiments of the present disclosed technology or in the prior art more clearly, the following briefly introduces the accompanying drawings required for describing the embodiments or the prior art. Apparently, the accompanying drawings in the following description show merely some embodiments of the present disclosed technology, and persons of ordinary skill in the art may still derive other drawings from these accompanying drawings without creative efforts.

Figure 1:
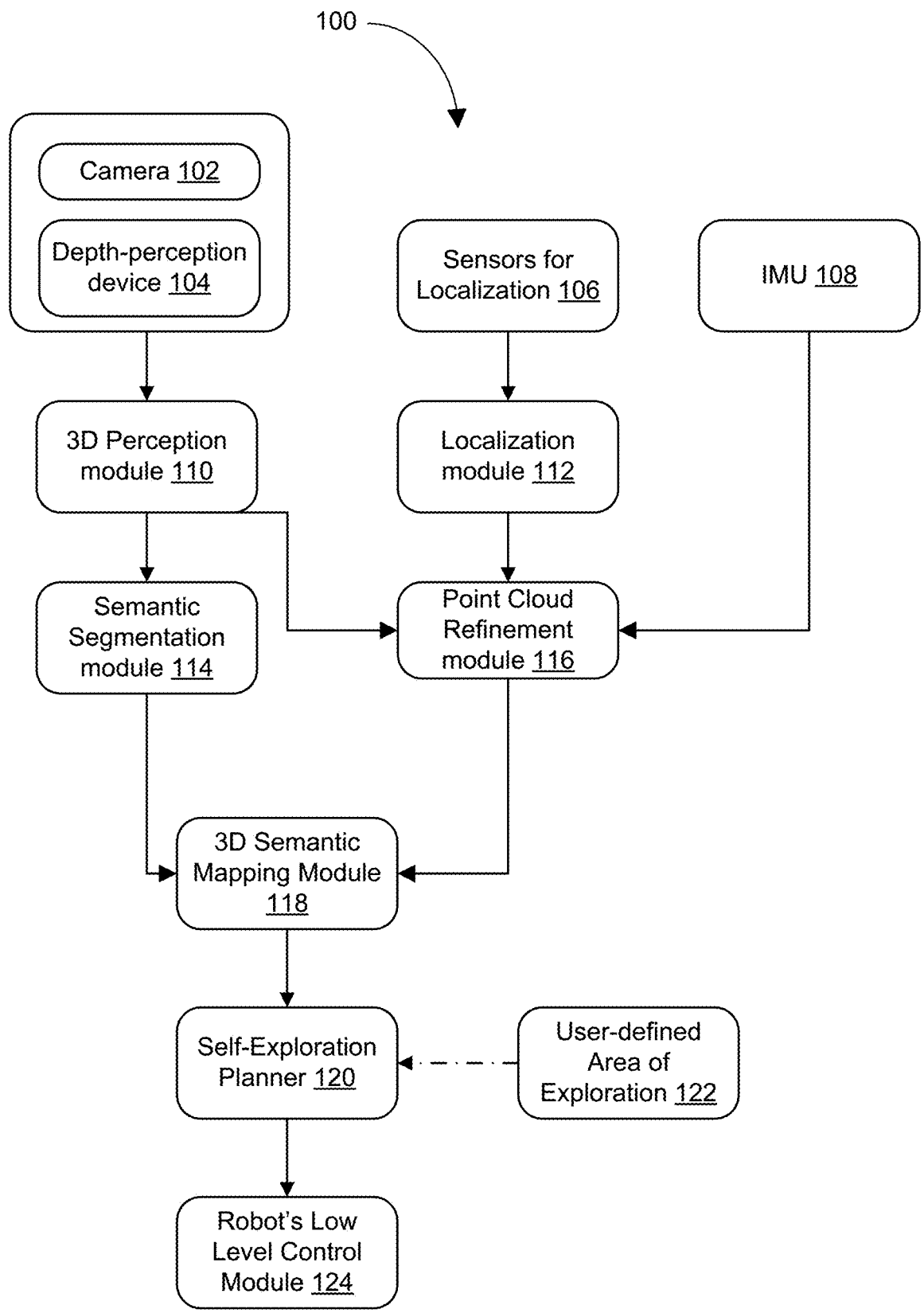

FIG. 1 is a schematic diagram of a layout of an example system 100 in which a mobile robot explores its environment autonomously or semi-autonomously, in accordance with some embodiments.

Figure 2:
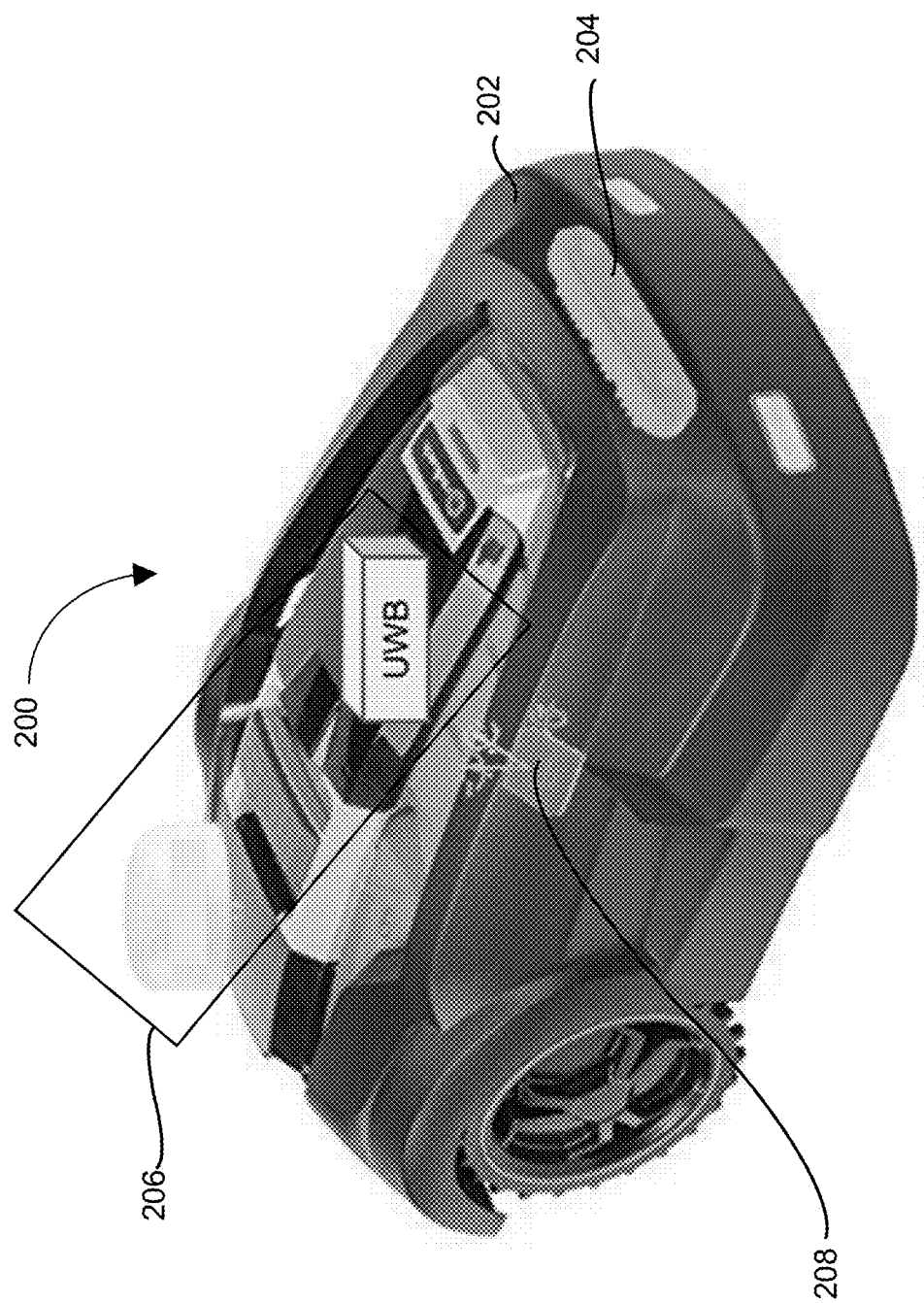

FIG. 2 show an example robot, in accordance with some embodiments.

Figure 3A:
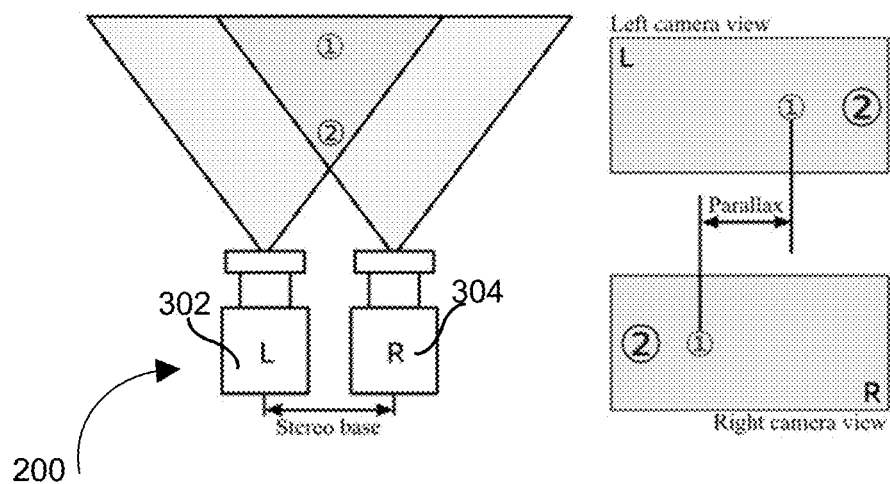

FIG. 3A shows an example stereo camera, in accordance with some embodiments.

Figure 3C:
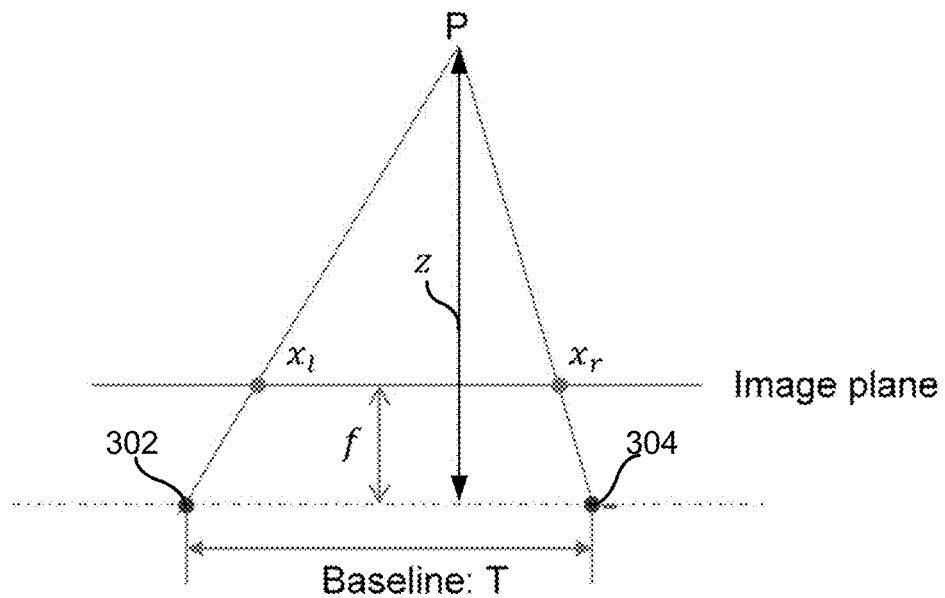
Figure 3B:
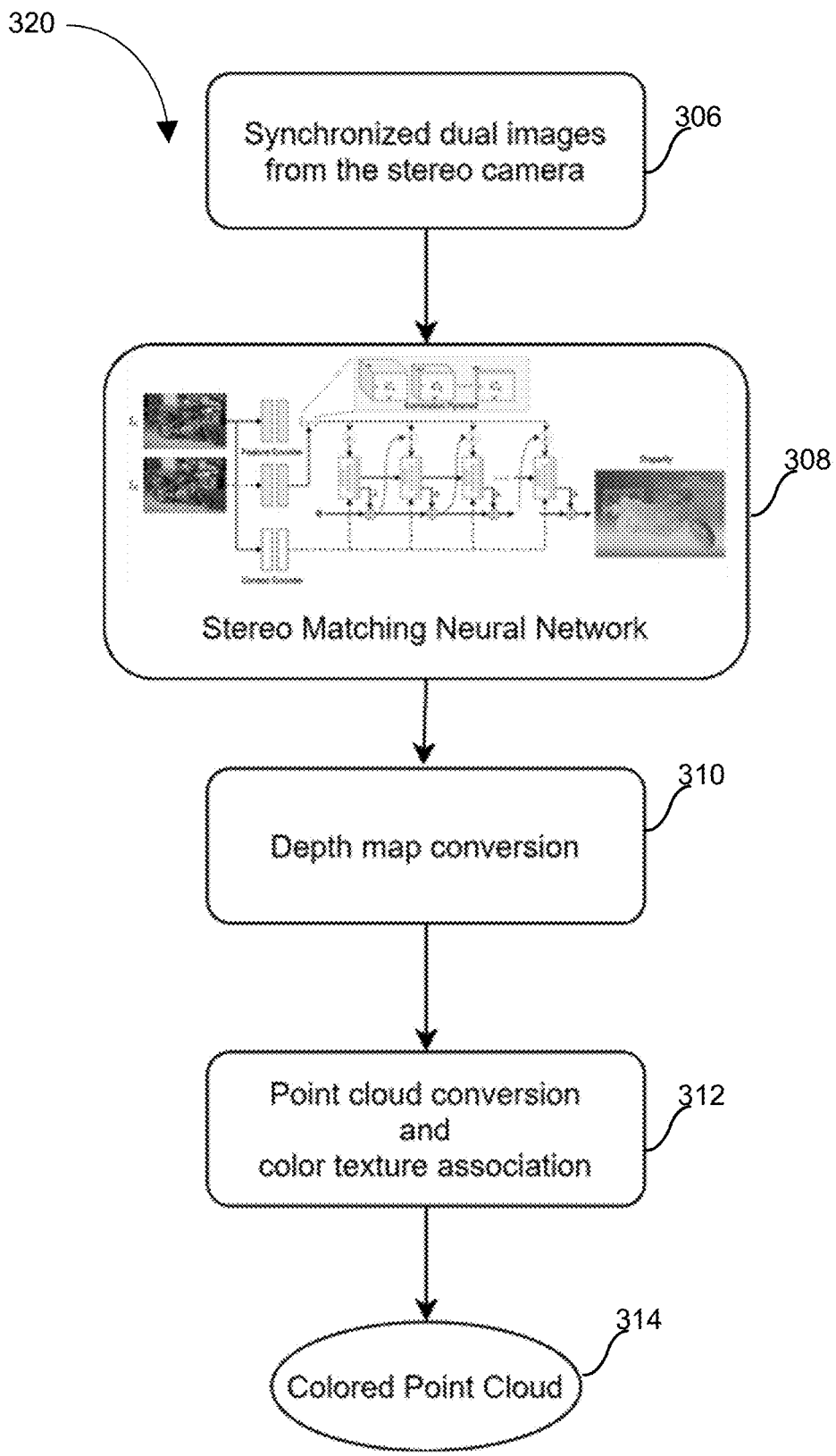

FIG. 3B shows an example process to obtain depth information from the images captured by the stereo cameras, in accordance with some embodiments.

FIG. 3C shows an example method for using disparity to estimate depth, in accordance with some embodiments.

Figure 4:
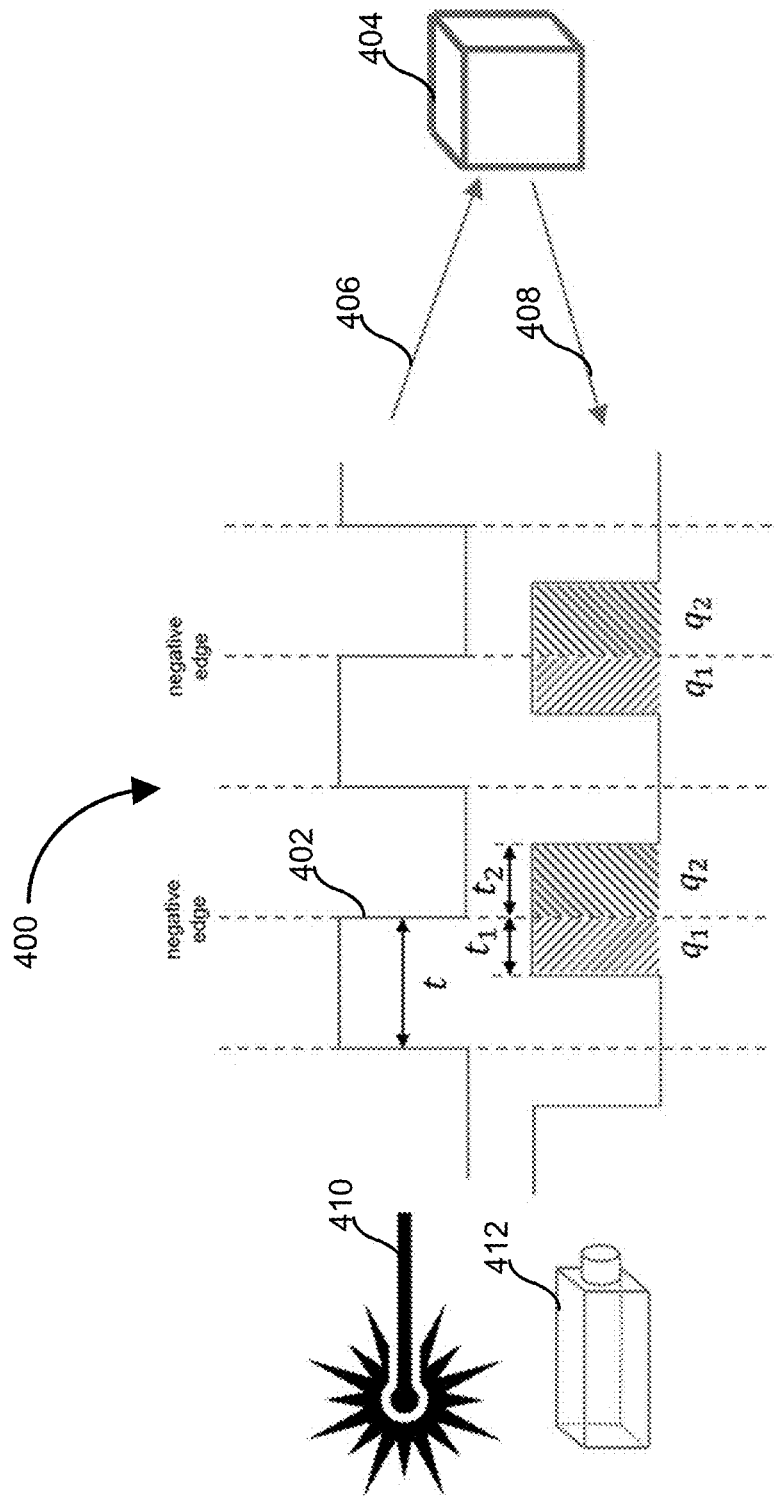

FIG. 4 shows an example time-of-flight detector, in accordance with some embodiments.

Figure 5A:
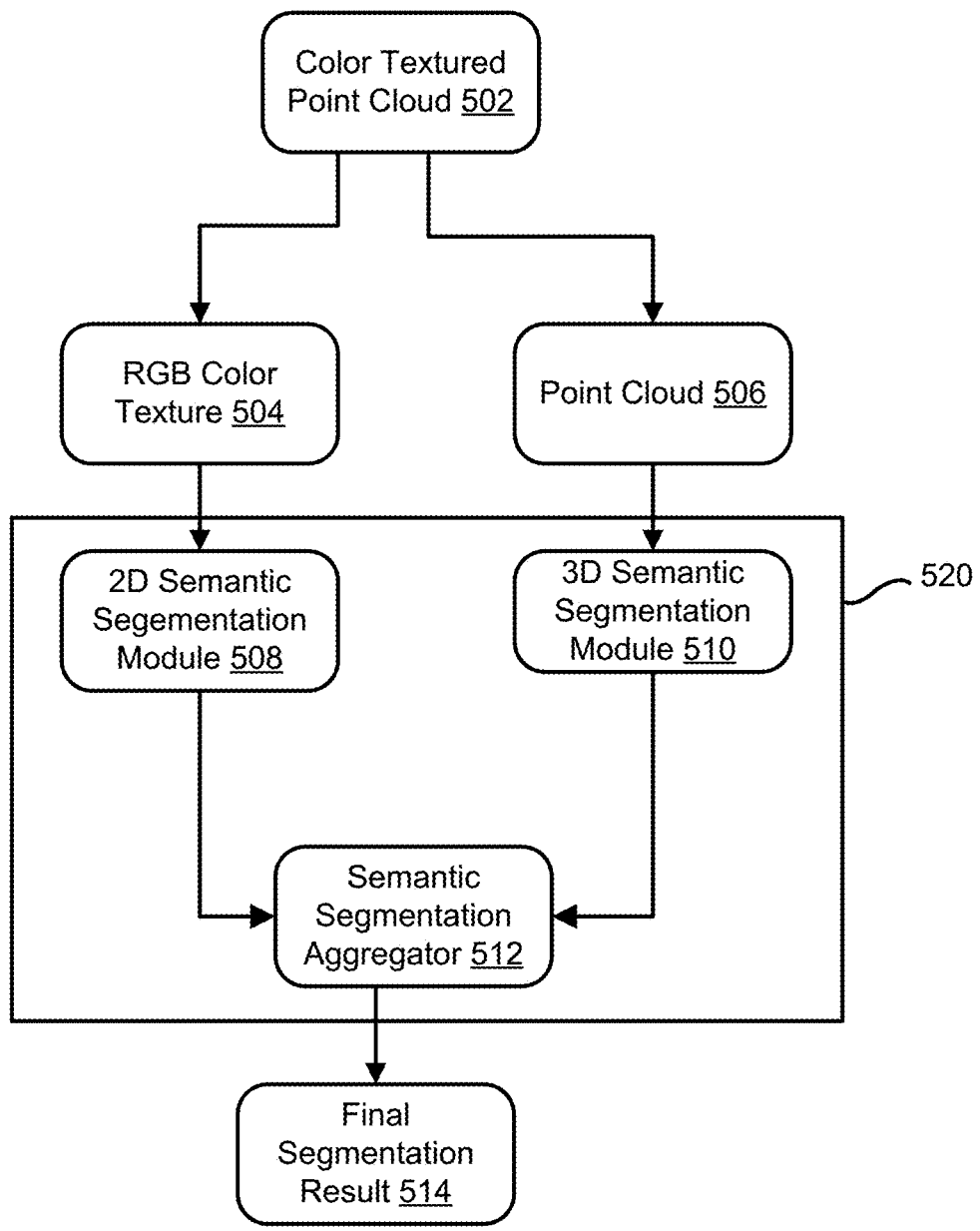

FIG. 5A shows how final segmentation results are generated, in accordance with some embodiments.

Figure 5B:
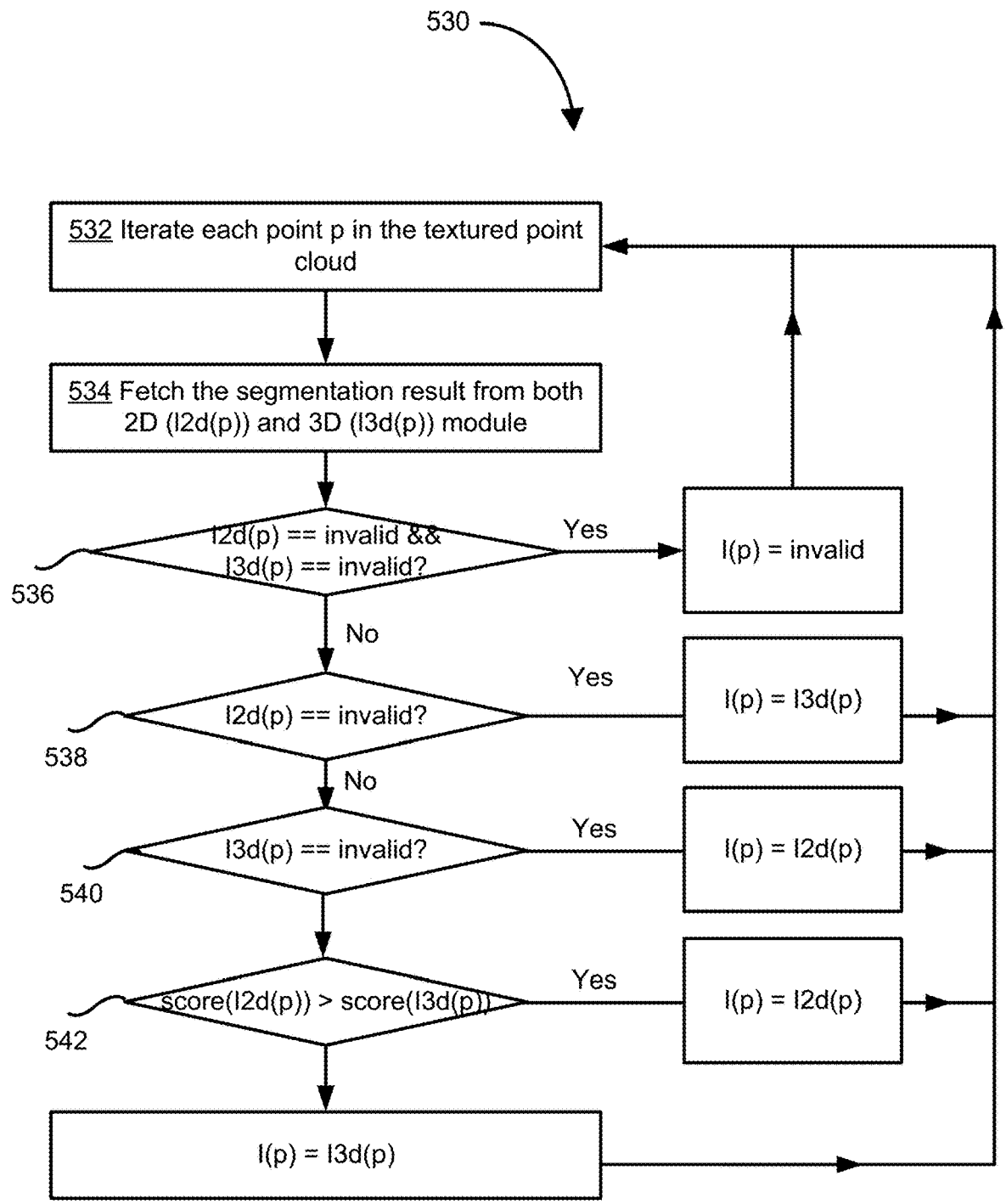

FIG. 5B shows how a method implemented in a semantic segmentation aggregator, in accordance with some embodiments.

Figure 5C:
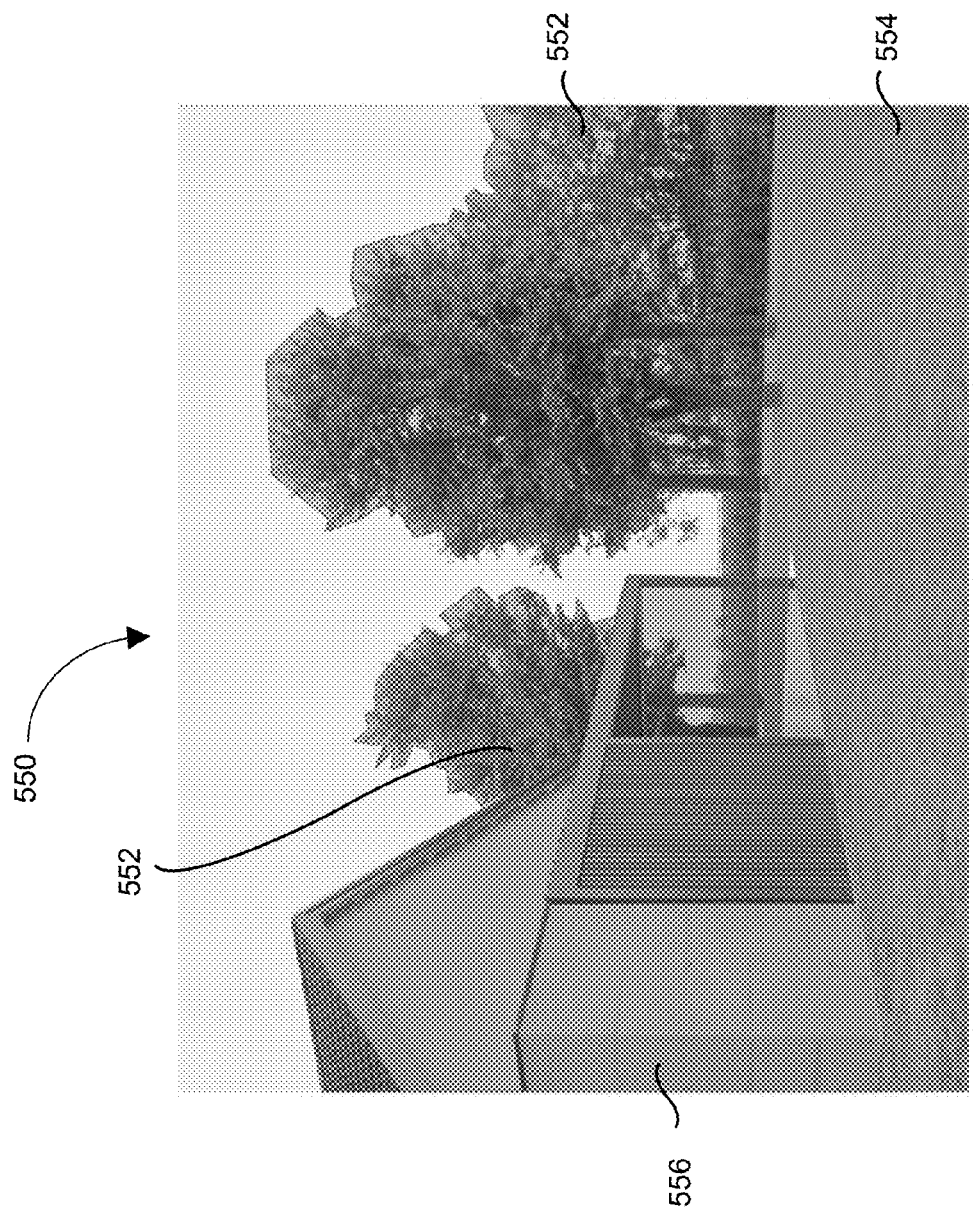

FIG. 5C shows an example result from the 2D semantic segmentation module 508, in accordance with some embodiments.

Figure 5D:
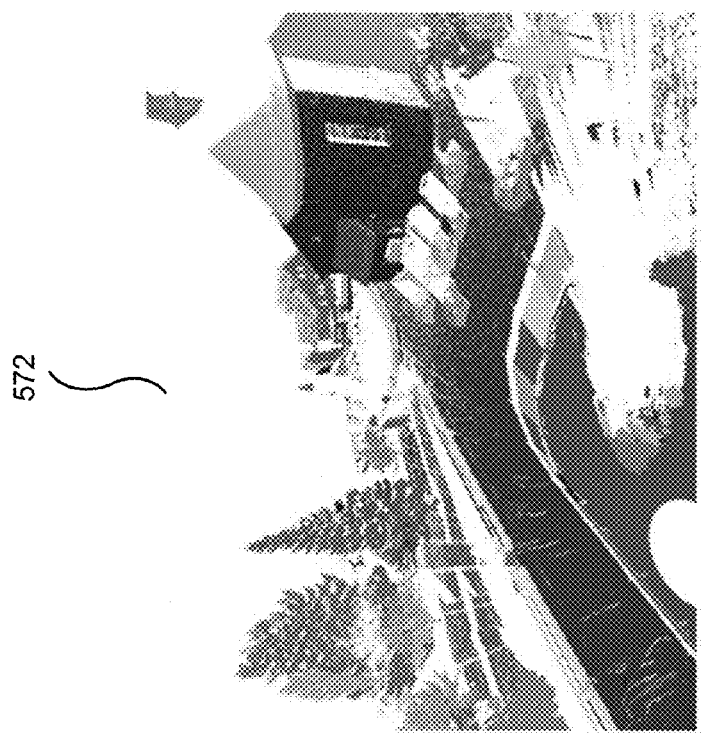
Figure 5D:
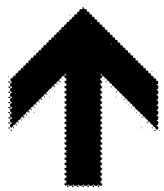
Figure 5D:
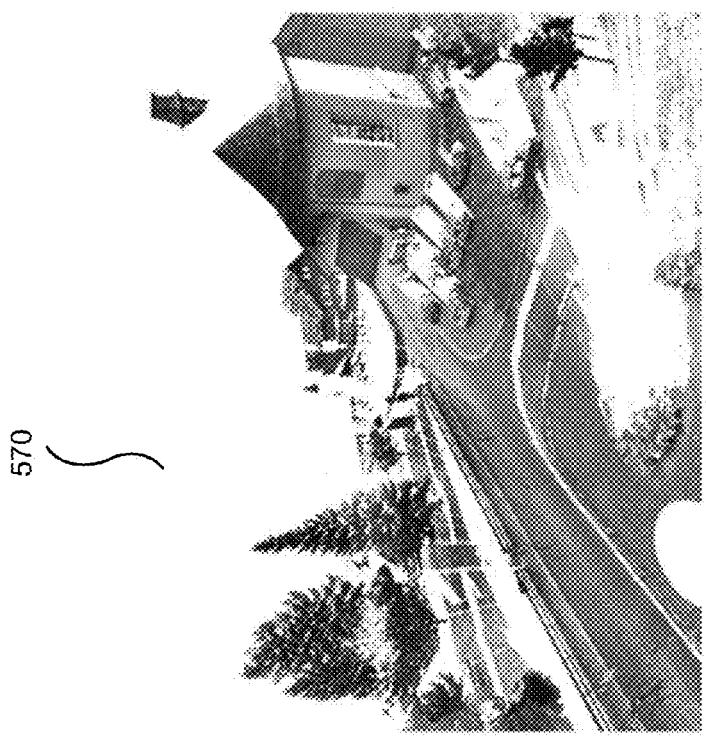

FIG. 5D illustrates an example output from semantic segmentation of the textured point cloud, in accordance with some embodiments.

Figure 6A:
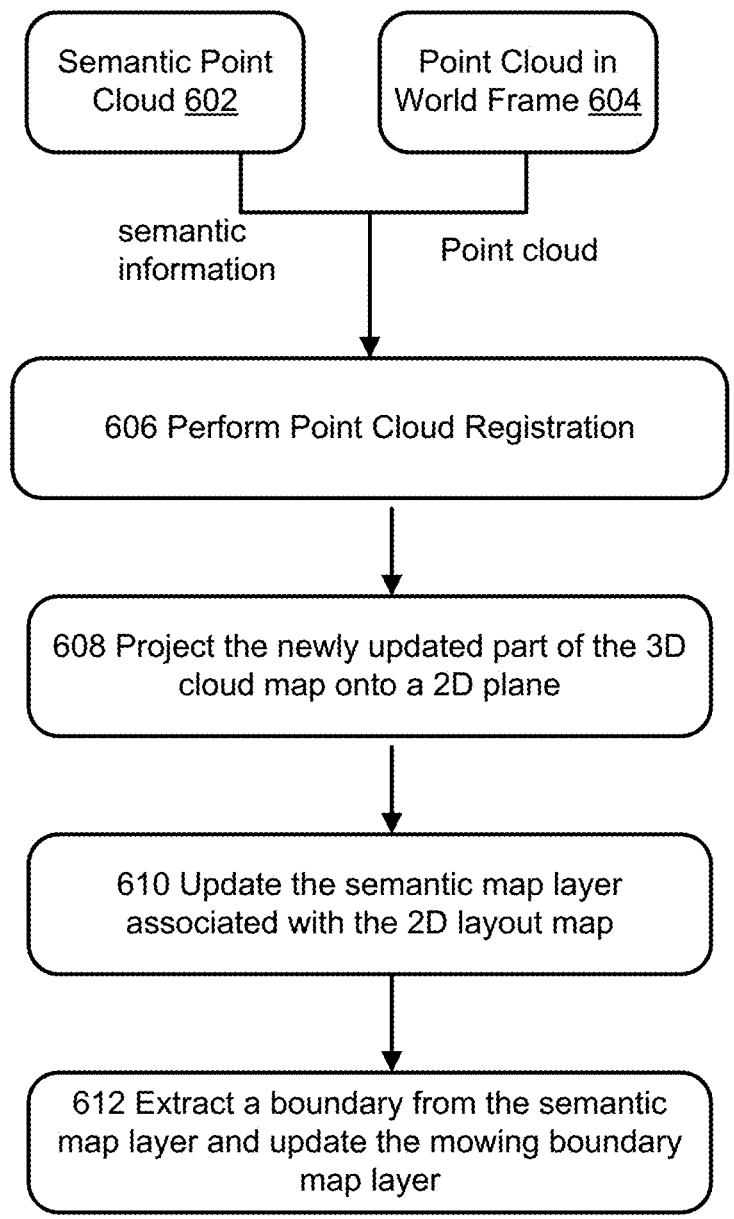

FIG. 6A shows how a robot determines a boundary the circumscribes its movement, in accordance with some embodiments.

Figure 6B:
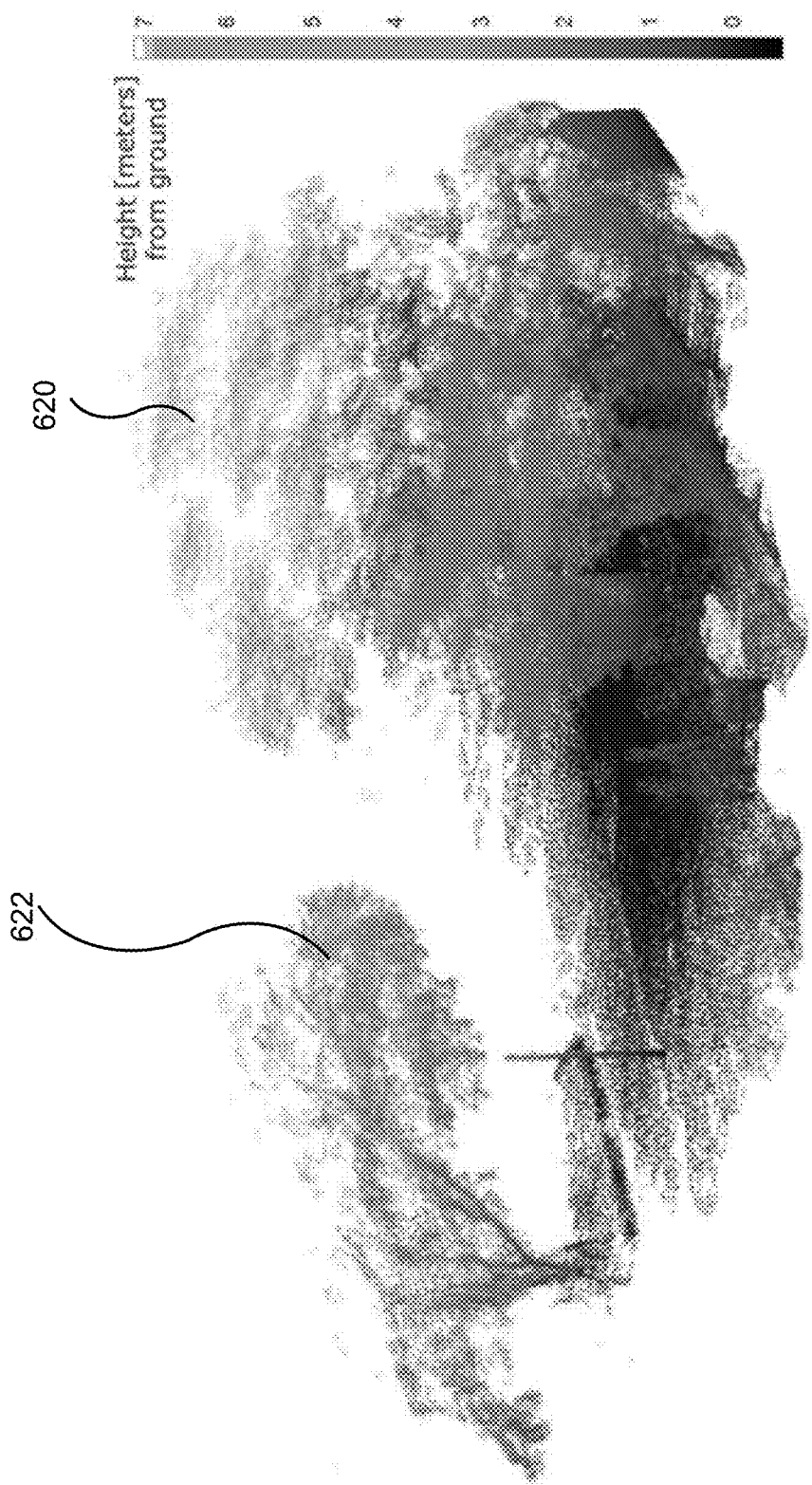

FIG. 6B shows registration of a newly obtained point cloud to a global point cloud, in accordance with some embodiments.

Figure 7:
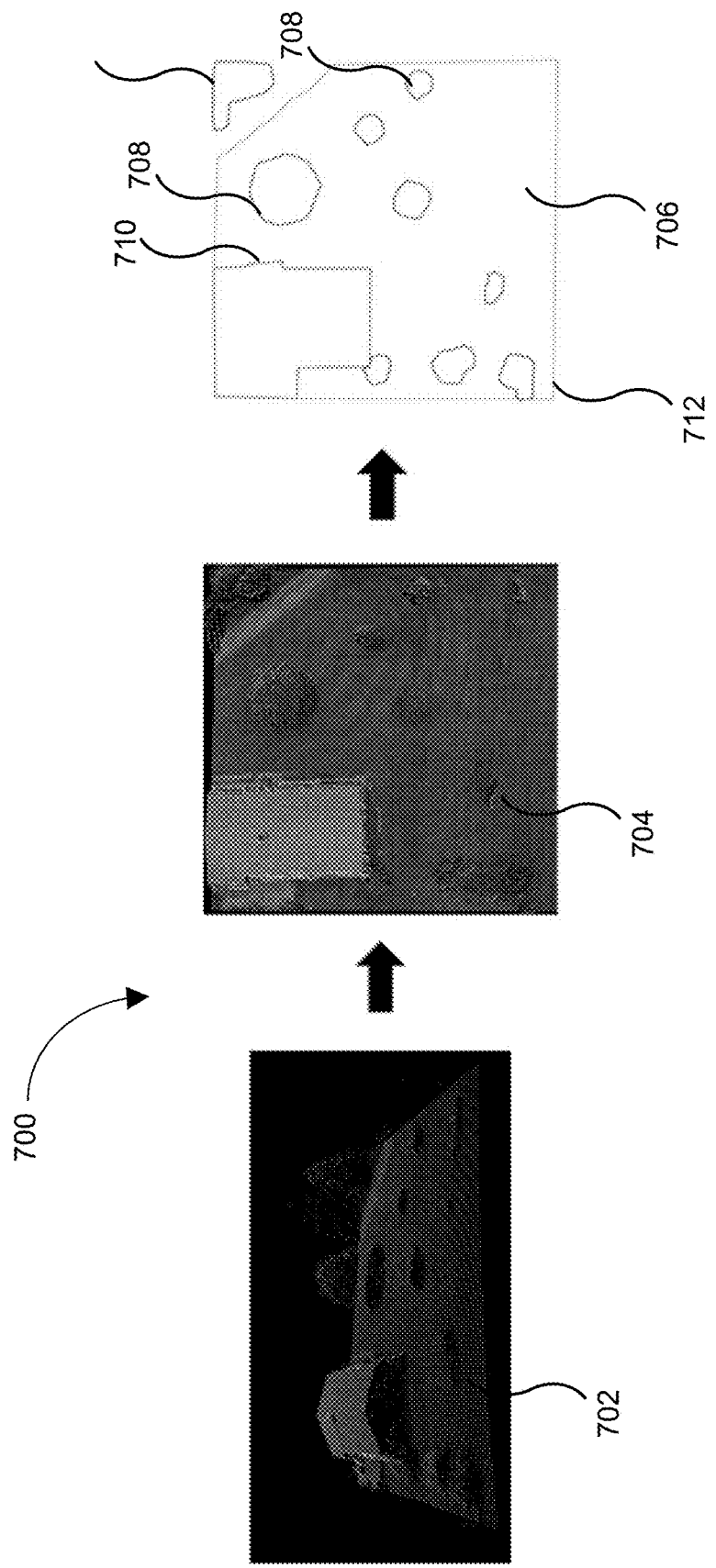

FIG. 7 shows an example process for generating a 2D layout layer that is used by the robot for navigation, in accordance with some embodiments.

Figure 8A:
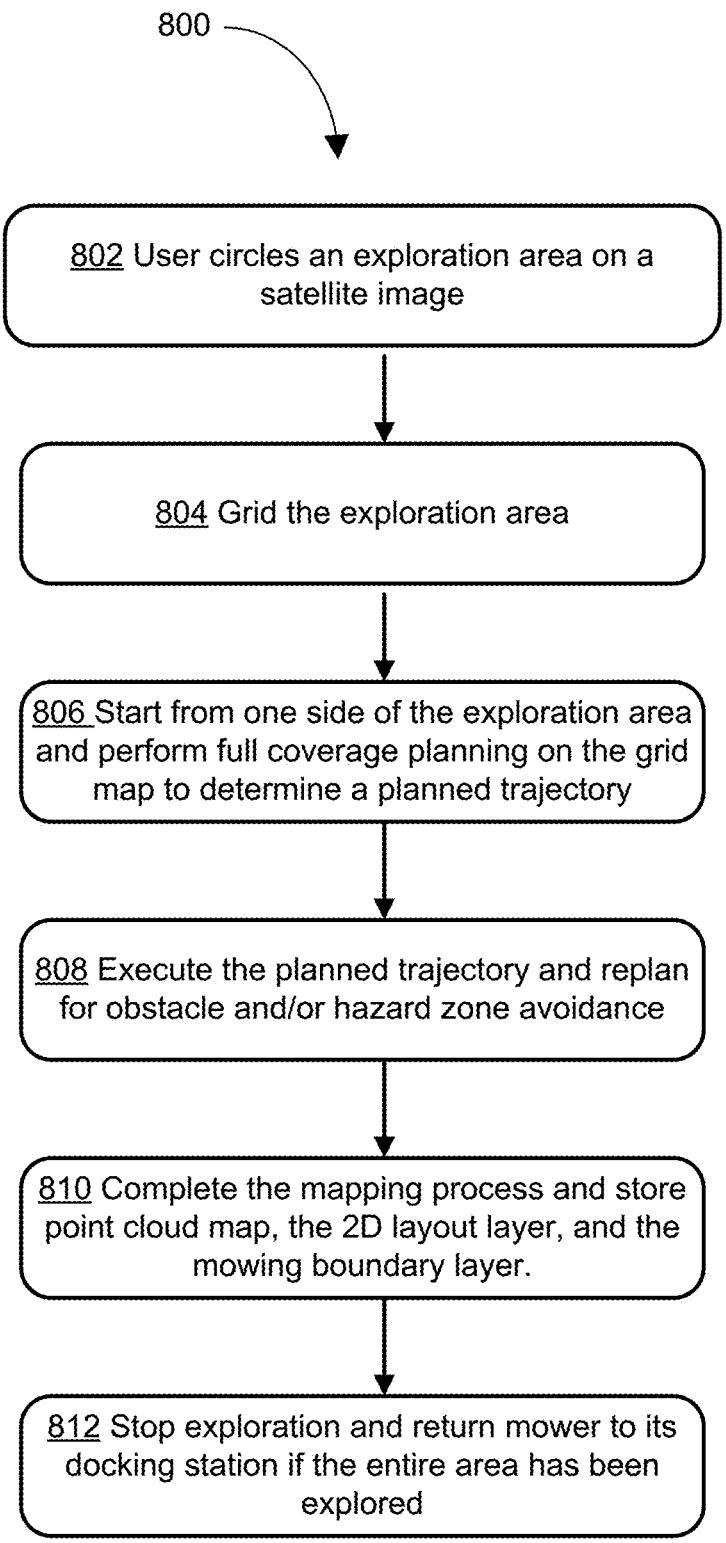

FIG. 8A shows an example process of a semi-automated exploration of by the robot of its environment, in accordance with some embodiments.

Figure 8B:

FIG. 8B shows an example of the semi-automated planning algorithm, in accordance with some embodiments.

Figure 9A:
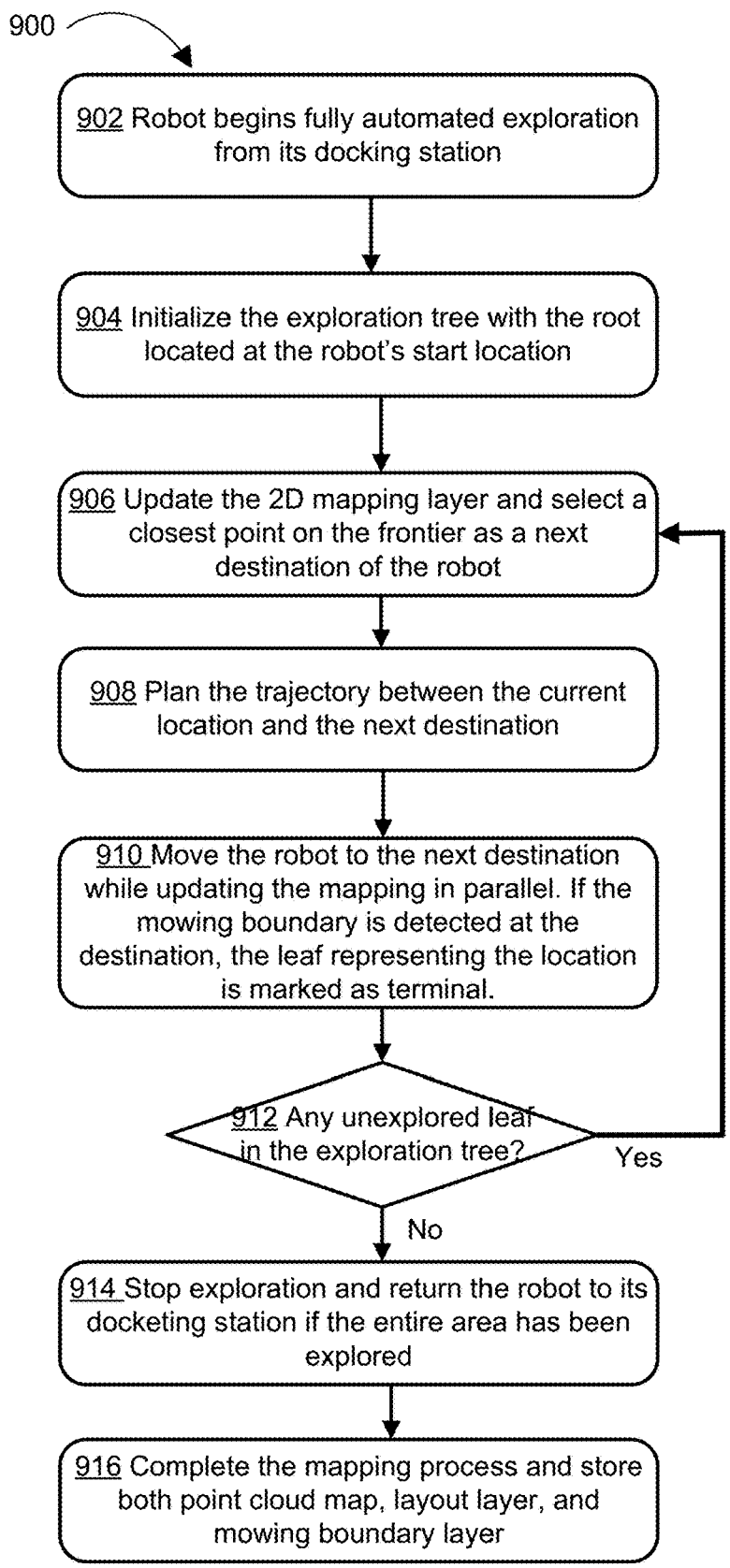

FIG. 9A shows an example process of a fully automated planning algorithm, in accordance with some embodiments.

FIG. 9B shows an example of an implementation of a fully automated planning algorithm, in accordance with some embodiments.

Figure 10:
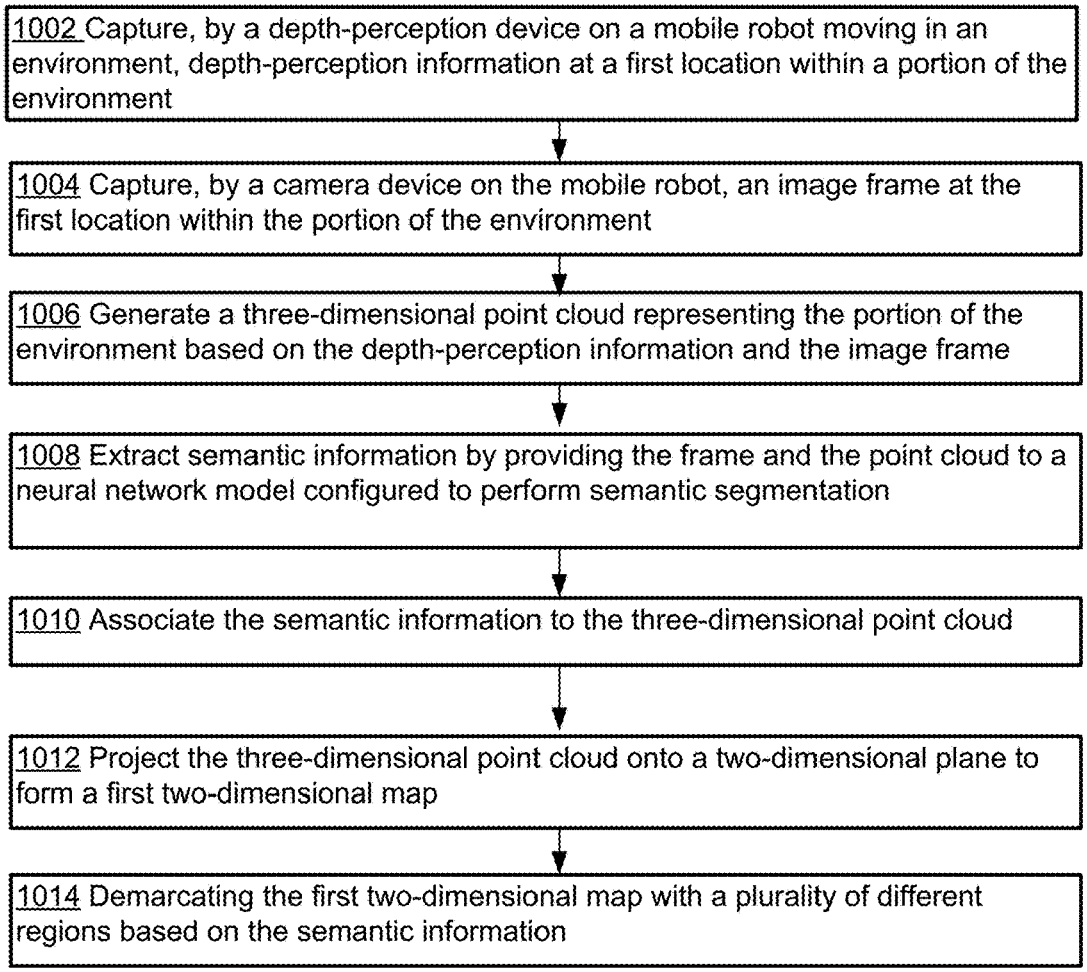

FIG. 10 illustrates an exemplary flowchart for a process of mapping an environment surrounding a mobile robot in accordance with some embodiments.

Figure 11:
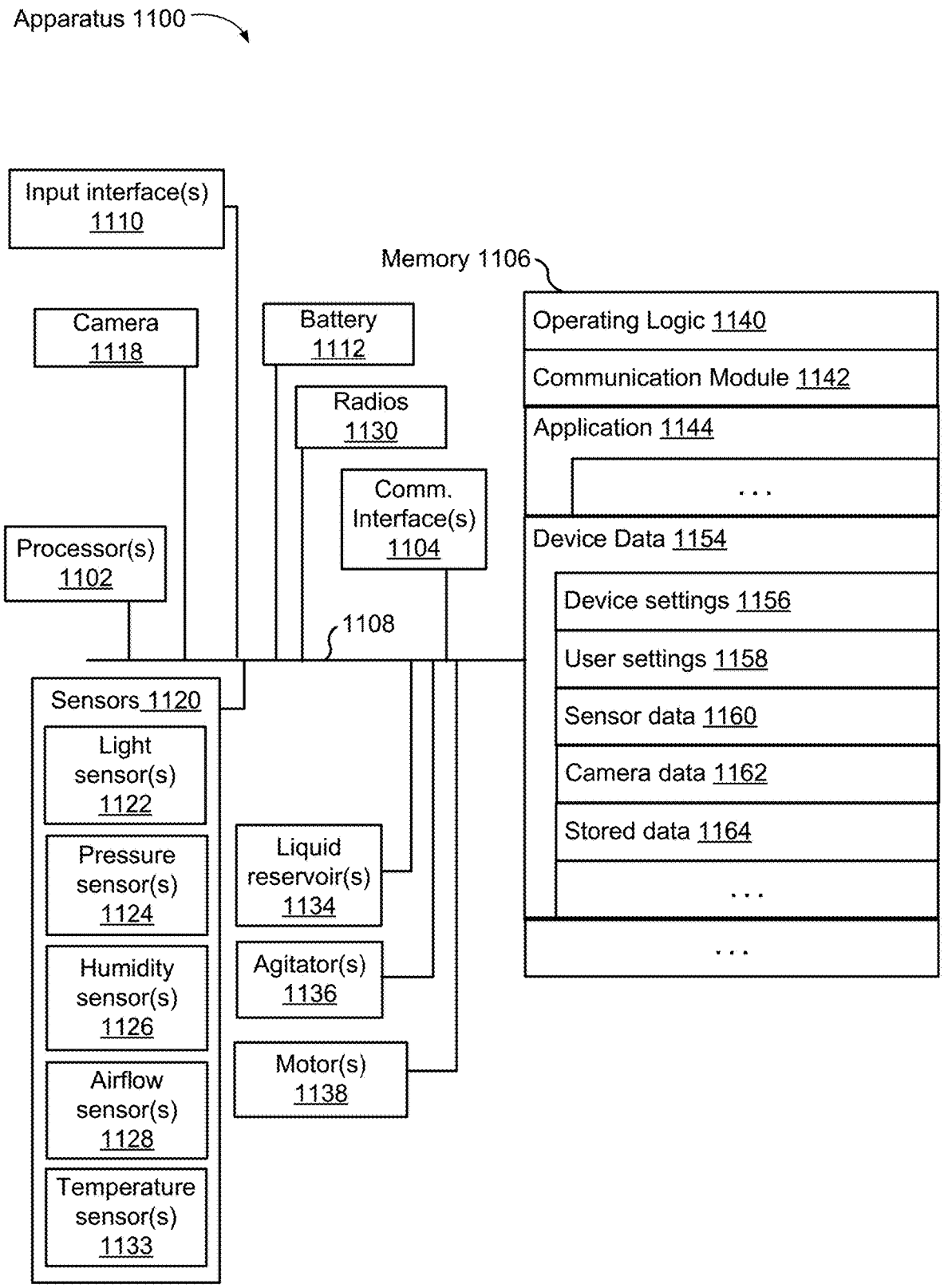

FIG. 11 is a block diagram of an electronic device that is configured to perform the methods described herein, in accordance with some embodiments.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

FIG. 1 is a schematic diagram of a layout of an example system 100 in which a mobile robot explores its environment autonomously or semi-autonomously, in accordance with some embodiments. The system 100 includes a camera 102 (e.g., a RGB camera) that captures one or more frames of a portion of the environment, and a depth-perception device 104. The system 100 also includes sensors 106 for localization, and an inertia measurement unit (IMU) 108. One or more of the camera 102, the depth-perception device 104, the sensors 106 for localization (e.g., GPS/UWB/Lidar or VSLAM solutions), and the IMU 108 are mounted to a robot moving through the environment autonomously or semi-autonomously.

Output from both the camera 102 and the depth-perception device 104 is provided to a 3D perception module 110. In some embodiments, the camera 102 is a red-green-blue (RGB) camera that captures one or more image frames of the environment. In some embodiments, the depth-perception device 104 is a depth-camera that captures corresponding depth information at the location where the camera 102 captures a respective image frame. The 3D perception module 110 combines input from both the camera 102 and the depth-perception device 104 (e.g., a RGB image and a depth image) to create a point cloud having texture information (e.g., a textured point cloud). In some embodiments, a point cloud is a set of data points in space (e.g., representing a 3D shape or a 3D object), and each point position has its set of coordinates. A textured point cloud refers to a point cloud that includes color and/or texture information. In some embodiments, texture is a function of spatial variation of the brightness intensity of the pixels. In some embodiments, each point in the textured point cloud has a position measured in camera frame.

The sensors 106 provide information to localization module 112, which in turn, outputs the pose of the robot (e.g., the robot's location/position and its heading angle) in the world frame (e.g., the world coordinate system) which is aligned with GPS coordinates.

A point cloud refinement module 116 receives, as input, the textured point cloud from the 3D perception module 110 and the pose of the robot from the localization module 112. The point cloud refinement module 116 converts the position of each point of the textured point cloud from camera frame to the world frame, using the pose of the robot. The point cloud refinement module 116 also receives input from the IMU 108 to correct effects due to changes in the robot's pitch angle as the robot traverses the environment. In some embodiments, the IMU 108 outputs the robot's acceleration and angular velocity, and allows motion compensations to provide for more accurate 3D mapping.

In parallel to the point cloud refinement module 116, the semantic segmentation module 114 combines both the RGB image (e.g., from the camera 102) and the point cloud (e.g., from the depth-perception device 104) as the input to a neural network model to detect lawn mowing boundary, ground types (lawn, driveway, road, etc.), permanent, temporary, and dynamic obstacles. In some embodiments, the semantic segmentation module 114 detects one or more of: 1) different types of grounds captured in a frame by the camera 102 (e.g., asphalt, grass, concrete, building, pavement) and (2) nature of obstacles captured in the frame (e.g., permanent, temporary, static, and/or dynamic obstacles etc.). In some embodiments, the point cloud refinement module 116 and the semantic segmentation module 114 run simultaneously instead of sequentially, allowing the processes to run faster. In some embodiments, the output from the semantic segmentation module 114 is in camera frame (e.g., not the world frame). For example, semantic segmentation module 114 further includes performing semantic annotation of objects observed in the environment using algorithms for 2D semantic segmentation (e.g., deep neural networks) on the pixel-level. Each of the semantic objects includes one or more semantic annotations and descriptors, such as categorical labels, appearance descriptors, shape descriptors, size attributes, material attributes, 3D position and orientation, etc.

In 3D mapping module 118, the semantic information from the semantic segmentation module 114 (e.g., provided in the camera frame) and the 3D textured point cloud from the point cloud refinement module 116 (e.g., in the world frame) are combined and associated to generate a 3D semantic map that is a multi-layer structure (e.g., including a mowing boundary layer, a 2D layout layer, etc.). In some embodiments, the multi-layer structure includes a map having multiple layers—each layer has its own focus (e.g., for autonomous driving, the layers may include: a road layer that contains information for static mission planning; a traffic information layer that contains information for dynamic missing planning; a road-lane connection layer that contains information for lane-level route planning; and a map feature layer that contains information for enhanced localization and perception).

In some embodiments, the optical sensors (e.g., RGB camera and the depth cameras) may not be able to map the entire area with a single observation. Instead, the robot traverses the environment to construct a map of the environment with sufficient details and accuracy. In some embodiments, the environment includes a mowing area that the robot is configured to mow. The robot includes a self-exploration planner 120 with two strategies of automatic exploration. The first strategy relies on a human operator to provide a rough boundary of the area to explore, or a user-defined area of exploration 122. The second strategy is fully automated (e.g., does not require any user-defined area of exploration 122) which is driven by a frontier exploration algorithm. In some embodiments, the user-defined area of exploration 122 is the area within a geofence annotated by the user.

The output of the self-exploration planner 120 is provided to a robot's low level control module 124. In some embodiments, the low-level control module 124 generates control signals to cause the robot to travel to different portions of the environment while carrying out its assigned task (e.g., mowing the lawn by traversing through the lawn).

FIG. 2 show an example robot, in accordance with some embodiments. A mobile robot 200 includes a robotic mower 202, an RGB camera and stereo camera 204, a localization module 206, and IMU sensors 208. In some embodiments, the localization module includes an ultra-wideband (UWB) module and a regular GPS module. In some embodiments, other precise localization solutions such as real-time kinematic GPS (RTK-GPS) are used. The mobile robot 200 also includes a computational device (e.g., processors etc.) and a persistent storage (e.g., nonvolatile storage).

Multiple types of depth-perception modules can include a stereo camera, a time-of-fly (ToF) sensor, or Lidar. ToF and Lidar can directly output depth data, while additional processing is applied to the output of the stereo camera to obtain depth data.

In some embodiments, for depth-perception modules that include a stereo camera, a depth image construction method is additionally implemented in the 3D perception module.

FIG. 3A shows an example stereo camera, in accordance with some embodiments. A stereo camera 300 includes two cameras (e.g., a left camera 302, and a right camera 304), which are separated by a stereo baseline (denoted as "stereo base") in FIG. 3A. Each camera observes a portion of the same scene and captures an RGB image. The two RGB images forming an overlapped region (shown as the intersecting triangle in FIG. 3A). The depth of each pixel in the overlapped region is estimated by parallax and post filtering (traditional method) or machine learning based methods.

FIG. 3B shows an example process to obtain depth information from the images captured by the stereo cameras, in accordance with some embodiments. A process 320 begins at a step 306 by receiving synchronized images (e.g., "synchronized dual images") from each of the two stereo cameras. In some embodiments, the pair of images are synchronized because an image is captured by each of the two cameras (e.g., at the same time) when the robot is at a particular location. At a step 308, the synchronized dual images are provided as input to a stereo matching neural network to generate a disparity map. In some embodiments, the stereo matching neural network adopts the 3D convolutional neural network architecture, and predicts the disparity map in an end-to-end manner (from images taken by stereo cameras to disparity map. At a step 310, a depth map conversion occurs. In some embodiments, equation (1) below is used to convert a disparity map to depth map. After applying equation (1) on each pixel of the disparity map (the disparity is actually $x_l - x_r$ for each pixel), the depth map can be constructed. At a step 312, point cloud conversion and color texture association are carried out to arrive at a colored point cloud at a step 314. In some embodiments, the process 320 occurs in a 3D perception module.

FIG. 3C shows an example method for using disparity to estimate depth, in accordance with some embodiments. In FIG. 3C, P is the world point, $x_l$ and $x_r$ are the observations on left and right images, respectively. T is baseline distance denoting the spatial separation between the left camera 302 and the right camera 304. f is the focal length of the left camera 302 (e.g., the right camera 304 has the same focal length f).

A depth z of the world point P is calculated to determine the point cloud, using the difference between the two observations $x_l$ and $x_r$, which refer to the same pixel's (e.g., the pixel capturing the world point P) location on the scanline in left and right image, based on the equation (1) below:

$$z = \frac{fT}{x_l - x_r} \quad (1)$$

In general, a pixel in an image having an image coordinate (u, v) can be converted into the three-dimensional coordinate (x, y, z) for the world point associated with that pixel using equation (2) below:

$$\begin{bmatrix} x \\ y \\ z \end{bmatrix} = z \begin{bmatrix} 1/f_x & -S/(f_x f_y) & (Sc_y - c_x f_y)/(f_x f_y) \\ 0 & 1/f_y & -c_y/f_y \\ 0 & 0 & 1 \end{bmatrix} \begin{bmatrix} u \\ v \\ 1 \end{bmatrix} \quad (2)$$

where is the associated depth, S is the skew, $f_x$ and $f_y$ are the focal length along x and y axes respectively, and $c_x$ and $c_y$ are the optical center. Skew is one of the prominent distortions that exists in an optical lens. For example, an image taken by a lens with skew distortion may result in an image that is stretched diagonally in one direction but squeezed in the other, depending on the value of S. In some embodiments, equation (2) is applied to a depth map (and is generally represented as a grayscale image with depth value embedded as pixel value). In some embodiments, lining up between the left and right images of the stereo camera is previously performed by the depth map conversion process. In some embodiments, the stereo camera parameters $f_x$, $f_y$, $c_x$, $c_y$, S are calibrated to be consistent between two stereo cameras with negligible errors. The depth map carries the same camera parameters.

In some embodiments, other than using a stereo camera, other types of depth-perception devices, such as a Time-of-Flight (ToF) sensor is used for depth measurements.

ToF sensors determine the relative distance of the object by measuring the time that the light travels from the sensor to the target object and back to the sensor. A ToF sensor usually includes of an illumination unit, optics (e.g., one or more optical lenses, bandpass filters) and an image sensor. In some embodiments, the illumination unit emits RF-modulated light beams (e.g., infrared light beams) of a certain frequency. The emitted light beam is reflected by objects' surface and returns to the sensor. The lens gathers and spectrally filters the returned light (e.g., by frequency of the reflected light), so only returned light having the same (or substantially the same frequency, within the bandpass filter) would pass the filter to reach the image sensor. The image sensor measures the time taken for the light from the illumination unit to reflect off the object and arrive back at the image sensor. The distance d of the object is then calculated using equation (3):

$$d = \frac{ct}{2} \frac{q_2}{q_1 + q_2} \quad (3)$$

where c is the speed of light, t is the length of the light pulse. The reflected light may show latency compared to the emitted signal because it takes time for the light to travel from the illumination unit to the object and travels back to the sensor after the reflection. Latency refers to a difference in timing between the emitted light pulse and the received light pulse, which is $t_2$ as shown in FIG. 4, which is equivalent to the time of flight.

FIG. 4 shows an example time-of-flight detector, in accordance with some embodiments. An illumination unit 410 emits a series of modulated pulses (e.g., RF-modulated IR pulses) 406 that are reflected off an object 404 as a reflected beam 408, which is then detected by an image sensor 412. Each pulse from the illumination unit 410 includes a negative edge 402 and has a pulse duration of t. The dotted lines between pulses in FIG. 4 are used to illustrate the shifting (or latency) between emitted and received light pulses. In some embodiments, the latency is $t_2$, which is typically on the order of nanoseconds. Photons (IR photons) captured by the image sensor 412 are converted to a voltage signal and integrated by circuits within the image sensor to yield an accumulated charge as the output. The total length of the pulse is t, a known quantity, then $$t_2 = \frac{q_2}{q_1 + q_2} t,$$

where $q_1$ and $q_2$ are the accumulated charge before and after the negative edge 402 of the emitting signal (align with $t_1$ and $t_2$'s timing). $t_1$ and $t_2$ are naturally aligned as the period t is the sum of $t_1$ and $t_2$. In some embodiments, the alignment happens between the negative edge and the received light pulse. In some embodiments, a switching circuit divides t into $t_1$ and $t_2$, and the switching circuit's switching timing is synchronized with the light pulse's positive/negative edges precisely so the accumulated charges $q_1$ and $q_2$ are proportional to $t_1$ and $t_2$.

After $t_2$ is determined, the distance d of the object is calculated by:

$$d = \frac{ct}{2} \frac{q_2}{q_1 + q_2} = \frac{ct_2}{2} \quad (4)$$

FIG. 5A shows how final segmentation results are generated, in accordance with some embodiments. In some embodiments, semantically segmenting an image involves using machine learning to provide a label (e.g., tree, ground, building) to every pixel in an image, such that a position of a particular object having a respective label (e.g., a group of all the pixels having the respective label) is located within the image.

FIG. 5A shows a diagram of the semantic segmentation module 114, which includes a 3D semantic segmentation neural network model 520. The color textured point cloud 502 is the output from the 3D perception module 110. The color textured point cloud can be separated into the RGB/color and/or texture component 504 and the point cloud component 506 (e.g., containing only the spatial distribution of points in the point cloud). The output from each of the 2D semantic segmentation module and the 3D semantic segmentation module is fused by a semantic segmentation aggregator 512 to generate the final segmentation result 514.

A 3D semantic segmentation neural network model 520 is used to process a color textured point cloud 502 received from 3D perception module 110. The 3D semantic segmentation neural network model 520 includes a 2D semantic segmentation module 508 and a 3D semantic segmentation module 510.

The 2D semantic segmentation module 508 analyzes a frame captured by the camera 102 (e.g., RGB camera, RGB color texture 504). In some embodiments, the color texture and RGB image are substantially the same.

FIG. 5C shows an example result from the 2D semantic segmentation module 508, in accordance with some embodiments. For example, when an RGB image is processed by the 2D segmentation neural network in the 2D semantic segmentation module 508, a result 500 is generated in which different regions in the RGB image is semantically segmented. For example, a building 556 is semantically segmented on the left side of the result 500. A lawn area 554 is semantically segmented on in the foreground region on the result 500. Several trees 552 are semantically segmented in the background region of the result 500. In some embodiments, relying solely on the 2D result 500 shown in FIG. 5C may not allow the several trees 552 to be individually differentiated along a depth dimension (e.g., loss of depth information from a single 2D image captured by the camera 102). In some embodiments, 2D semantic segmentation is done on the color texture because the color texture is directly associated with the point cloud.

To enhance accuracy, a 3D semantic segmentation module 510 is used to semantically segment a point cloud processed by Point Cloud Refinement Module 116, which converts the point cloud from stereo frame to world frame. In some embodiments, a point cloud 506 used as the input to the 3D semantic segmentation module 510 does not include any color or texture information, and contains only spatial information of each point cloud. In some embodiments, the RGB color and texture information 504 is removed from the colored textured point cloud 502 (generated by the 3D perception module 110) to obtain the point cloud 506.

In some embodiments, the point cloud generated by the 3D perception module 110 differs only in density and accuracy of the points in the point clouds depending on whether ToF, Lidar or stereo cameras are used in the 3D perception module 110. In some embodiments, the 3D semantic segmentation module 510 provides results based in part on the spatial distribution of the points in the point cloud, without relying on RGB or texture information. Using both the 2D semantic segmentation module 508 and the 3D semantic segmentation module 510 helps to improve the accuracy of semantic segmentation by incorporating the use of RGB and texture values for semantic segmentation (e.g., using the 2D semantic segmentation module 508) and the spatial distribution of points in the point cloud (e.g., using the 3D semantic segmentation module 510).

FIG. 5B shows how a method implemented in a semantic segmentation aggregator, in accordance with some embodiments. A semantic segmentation aggregator 512 fuses results from both the 2D semantic segmentation module 508 and the 3D semantic segmentation module 510 using a voting scheme to achieve better accuracy. In a process 530, a semantic segmentation aggregator 512 begins at a step 532 by selecting a point p in the textured point cloud 502 (e.g., in the camera frame). For each point in the textured point cloud, the segmentation result is retrieved from the 2D semantic segmentation module 508 and the 3D semantic segmentation module 510. The process 530 includes fetching, at a step 534, segmentation results from the 2D semantic segmentation module 508 and the 3D semantic segmentation module 510. The result from the 2D semantic segmentation module 508 for the point p is denoted as I2d(p), and the results from the 3D semantic segmentation module 510 for the point p is denoted as I3d(p). In some embodiments, the result provides a label and a score (e.g., represented as (label, score)). At a step 536, in accordance with a determination that the results from both the 2D semantic segmentation module 508 and the 3D semantic segmentation module 510 are invalid, the semantic segmentation aggregator 512 returns a result indicating that the point p corresponds to an invalid result. At a step 538, in accordance with a determination that the results from the 2D semantic segmentation module 508 is invalid, the semantic segmentation aggregator 512 returns a result indicating that the point p corresponds to the results determined by the 3D semantic segmentation module 510. At a step 540, in accordance with a determination that the results from the 3D semantic segmentation module 510 is invalid, the semantic segmentation aggregator 512 returns a result indicating that the point p corresponds to the results determined by the 2D semantic segmentation module 508. At a step 542, the semantic segmentation aggregator returns, as the output, the result from the 2D semantic segmentation module 508 and the 3D semantic segmentation module 510 that has the higher score. In some embodiments, the score is a confidence score that ranges from 0 to 1. If the score of the segmentation result from the 2D semantic segmentation module 508 is higher than the score of the result from the 3D semantic segmentation module 510, the semantic segmentation aggregator 512 uses the results from the 2D semantic segmentation module 508 as the final segmentation result 514. Conversely, if the score of the segmentation result from the 3D semantic segmentation module 510 is higher than the score of the result from the 2D semantic segmentation module 508, the semantic segmentation aggregator 512 uses the results from the 3D semantic segmentation module 510 as the final segmentation result 514.

FIG. 5D illustrates an example output from semantic segmentation of the textured point cloud, in accordance with some embodiments. A starting three-dimensional input 570 (e.g., 570 is an illustration of textured point cloud, where occluded points are rendered as a white area) is semantically segmented so that different type of grounds (e.g., asphalt, grass, lawn, snow, water) and objects are painted in different colors, as shown in an output 572. In some embodiments, the output 572 corresponds to the final segmentation result 514 shown in FIG. 5A. In some embodiments, the points on the output 572 are segmented using the results from the semantic segmentation aggregator module 512 which is the fused output of the 2D semantic segmentation module 508 and the 3D semantic segmentation module 510 based on the process 530 described in FIG. 5B. In some embodiments, the points on the output 572 are segmented using the results from the semantic segmentation aggregator module 512 which is the fused output of the 2D semantic segmentation module 508 and the 3D semantic segmentation module 510 based on the process 530 described in FIG. 5B. Even though the images shown in FIG. 5D appear to be two-dimensional images, they are both three dimensional representations of the point cloud. The difference between the point cloud shown in the output 572 and that shown in FIG. 6B is that the output 572 is a local observation of the global point cloud, whereas the point cloud shown in FIG. 6B is a global point cloud.

FIG. 6A shows how a robot determines a boundary the circumscribes its movement, in accordance with some embodiments. In some embodiments, the robot is a lawn mower and the boundary is a mowing boundary within which the robot carries out its mowing operations. A semantic point cloud 602 and a point cloud in world frame is provided to a 3D mapping module 118. The point cloud in world frame 604 is derived from the depth-perception device 104 and the 3D perception module 110. In some embodiments, the semantic point cloud 602 corresponds to the output from the final segmentation results 514. The semantic point cloud 602 output by the semantic segmentation module 114 is in the sensor's frame (e.g., stereo camera, Lidar, or other depth-perception device) and are converted to the world frame using the localization signal output by 112. Point cloud registration includes first converting the semantic point cloud 602 from the camera frame into the world frame, using Equation (4). The point cloud refinement module 116 converts each point's location from the camera frame (e.g., (u, v)) into world frame (e.g., (x, y, z)). At a step 606, the 3D mapping module 118 performs point cloud registration, as shown in FIG. 6B. The newly created semantic point cloud 602 is registered onto the global point cloud stored in the memory and added (e.g., stitched) to the global point cloud (e.g., the global point cloud is blank when the robot first begins exploration of the environment).

The semantic point cloud is converted from the camera frame to the world frame because the 3D mapping module 118 works under a consistent coordinate system (e.g., world frame) regardless the robot's motion. The camera frame is converted to world frame by combining both localization data $x^w$, $y^w$, $z^w$, $\alpha$, and IMU readings (essentially through the accelerometer) y which are pitch and roll angles.

$$R_c^w = \begin{pmatrix} \cos\alpha\cos\beta & \cos\alpha\sin\beta\sin\gamma - \sin\alpha\cos\gamma & \cos\alpha\sin\beta\cos\gamma + \sin\alpha\sin\gamma \\ \sin\alpha\cos\beta & \sin\alpha\sin\beta\sin\gamma + \cos\alpha\cos\gamma & \sin\alpha\sin\beta\cos\gamma - \cos\alpha\sin\gamma \\ -\sin\beta & \cos\beta\sin\gamma & \cos\beta\cos\gamma \end{pmatrix}$$

$$T_c^w = [x^w \ y^w \ z^w]^T$$

$$H_c^w = \begin{bmatrix} R_c^w & T_c^w \\ 0 & 1 \end{bmatrix}$$

Then each point in the point cloud can be converted to world frame by the simple formula below:

$$\begin{bmatrix} X \\ 1 \end{bmatrix} = H_c^w \begin{bmatrix} Y \\ 1 \end{bmatrix}$$

Where $Y \in R^{3}$ is the point's position in sensor's frame and $X \in R^{3 \times 1}$ is converted position in world frame. In some embodiments, $Y \in R^{3 \times 1}$ corresponds to the result of Equation (2) if the depth-perception unit includes a stereo camera. For depth-perception using Lidar and ToF sensors, $Y \in R^{3 \times 1}$ would be the direct output from the sensor (e.g., each point in the point cloud has (x, y, z) readings).

The 3D mapping module 118 stores in its memory, a record of the global point cloud for the area that the robot has explored so far. When a new point cloud is received from the point cloud refinement module 116, the underlying point cloud registration submodule registers the new point cloud into the stored global point cloud (e.g., a global point cloud 620 as shown in FIG. 6B). The semantic information is also extracted and combined.

In some embodiments, a global index is assigned or associated to each point in the point cloud. The global index includes information such as the spatial coordinates (x, y, and z coordinates in the camera frame and/or the world frame), RGB values, texture information, and semantic labeling (e.g., from the final segmentation result 514, e.g., semantic labeling of "tree," "building," "swimming pool," "lawn," etc.) for a particular point.

At a step 608, a 2D layout layer generator projects the point cloud (within predefined range of height) to a 2D plane to provide a bird's eye view of the region explored by the robot. In some embodiments, the 2D projection of the point cloud occurs within a predefined range of height (e.g., the predefined range of height limits features at or below the height limit in the global point cloud to be projected onto the 2D plane). In some embodiments, the use of the global index helps to accelerate a look up process for generating the 2D layout layer (e.g., as shown in FIG. 7). Instead of manipulating a three-dimensional point cloud, a 2D layout layer provides relevant information used by the robot for navigation. For example, instead of 1000 points in the 3D point cloud, the 2D layout layer generator projects 50 points onto the 2D plane. The global index helps the 2D layout layer generator to retrieve the relevant semantic information associated with each of the 50 points. Then, based on the semantic data, contours of different areas can be extracted and demarcated on the 2D layout layer. The 2D layout layer is updated on-the-fly as the robot explores its environment by the 3D mapping module 118.

FIG. 6B shows registration of a newly obtained point cloud to a global point cloud, in accordance with some embodiments. FIG. 6B shows a global point cloud 620 derived from earlier exploration and navigation of the mobile robot in its environment. A newly generated point cloud 622 is registered relative to the stored global point cloud 620 based on the output of the multimodal sensing units on the mobile robot.

FIG. 7 shows an example process for generating a 2D layout layer that is used by the robot for navigation, in accordance with some embodiments. A process 700 begins as the robot makes observations while exploring its environment. In some embodiments, a RGB image 702 (e.g., a RGB image frame) is captured by the camera 102. The RGB image 702, when compared with the observations made by the depth-perception module (e.g., a stereo camera or Lidar or ToF detector) is then registered into a three-dimensional (3D) point cloud 704. The point cloud 704 represents a single observation of the global 3D point cloud. After the three dimensional point cloud is obtained, the two dimensional layout generator then projects the three dimensional point cloud onto a two dimensional plane and marks the two dimensional plane using semantic information obtained by the semantic segmentation neural networks and generates a 2D layout map 706. The 2D layout map 706 demarcates (e.g., using contour lines) various features recorded in the three-dimensional point cloud. For examples, the locations of trees 708, a building 710, and a boundary 712. In some embodiments, the boundary 712 circumscribes the movement of the robot to the region within the boundary 712. In some embodiments, the boundary 712 is a mowing boundary beyond which the robot does not traverse or mow. In some embodiments, features (a tree 708) beyond the boundary 712 is shown on the 2D layout map 706.

In some embodiments, the mowing boundary is extracted into a separate mowing boundary layer and provided to a safety module of the robot. The safety module of the robot may be an added redundancy to ensure safe operation of the robot. For example, the mowing boundary allows the safety module to cause the robot to make an emergency stop if the robot/mower crosses the mowing boundary. In some embodiments, an accuracy of the layout map 706 is better than 50 cm (e.g., better than 40 cm, better than 30 cm, better than 20 cm, better than 10 cm, about 10 cm).

To map the entire mowing area, a semi-automated or a fully automated exploration algorithm can be used.

FIG. 8A shows an example process of a semi-automated exploration of by the robot of its environment, in accordance with some embodiments. A process 800 begins when a user of the robot is provided with a satellite image of an exploration area. In a step 802, the user circles an exploration area on the satellite image to provide an estimated range of where the robot should confine its exploration (e.g., the user circles an outer boundary of the exploration area, without providing instructions for avoiding obstacles and or hazards within the circled region.)

In a step 804, the semi-automated exploration algorithm (e.g., stored in a memory of the robot, and executed by a processor on the robot) automatically grids the exploration area circled by the user in the step 802. In some embodiments, gridding the exploration area includes dividing the exploration area into regular segments. In some embodiments, gridding the exploration area includes providing square or rectangular grids overlaid on top of the satellite image.

In a step 806, the robot starts from one side of the exploration area and performs full coverage planning on the grid map to determine a planned trajectory. In some embodiments, the full coverage planning uses a zigzag pattern to plan a trajectory that traverses all grids within the exploration area. In some embodiments, the robot performs an initial semantic segmentation on the satellite image to understand its surrounding prior to the beginning its exploration. Existing technology can coarsely segment lawn, road, forest, swimming pool, pond, etc. In a step 808, the robot executes the planned trajectory and replan for obstacle and or hazard avoidance during the exploration process (e.g., backing away from, and/or avoiding a swimming pool, or an obstacle). During the step 808, the robot observes the environment by capturing a frame of the environment using the camera 102 and the depth perception device 104 to generate a 3D point cloud of the environment. The 2D layout map generator projects the 3D point cloud onto a 2D layout map. The accuracy of the 2D layout map is better than the satellite image initially provided to the robot (e.g., an accuracy better than 40 centimeters, better than 30 centimeters, better than 20 centimeters, or about 10 centimeters.) In a step 810, the robot stores the updated 3D point cloud, the 2D layout layer and the mowing boundary layer to complete the mapping process. In some embodiments, the 3D point cloud/layout layer is updated at every position traversed by the robot. In some embodiments, the 3D point cloud/layout data is uploaded to the cloud server, which allows user applications to access the 3D point cloud/layout data after the robot has returned to its docking station (e.g., after a step 812). In some embodiments, uploading the data to the cloud server may more preferably be performed when the robot has access to continuous external power supply.

In a step 812, in accordance with a determination that the robot explored the entire area within the region circled by the user in the step 802, the robot stops exploring the environment and returns to its docking station. In some embodiments, when the robot is a lawn mower, the robot mows the lawn while carrying out the exploration of the environment (e.g., the robot is done mowing the region circled by the user in the step 802 when the robot is done fully exploring the region).

FIG. 8B shows an example of the semi-automated planning algorithm, in accordance with some embodiments. At the step 802, the user provides a marking of a boundary 820 within which the robot is to explore. The semi-automated planning algorithm of the robot automatically generates a number of grids 822 overlaid on top of the selected region marked within boundary 820. In the step 806, the robot plans across an initial trajectory 284 across the gridded region. In some embodiments, the initial trajectory may include the robot crossing some untraversable regions (e.g., a swimming pool). In some embodiments, the initial trajectory focuses on full coverage without considering the obstacles or hazard areas such as the swimming pool. In some embodiments, semantic segmentation using satellite images is less reliable (e.g., wrongly detect hazardous areas due to occlusion, out-of-date satellite images, etc.) than an automatic mowing robot's real-time perception at closer distance. Use of semantic segmentation information based on satellite images may lead to insufficient exploration. During the step 808, the robot uses semantic segmentation to more accurately localize and characterize the obstacles and hazards along the initial trajectory, and implements an updated trajectory to avoid those obstacles until all regions (e.g., traversable regions) within the boundary 820 have been explored.

FIG. 9A shows an example process of a fully automated planning algorithm, in accordance with some embodiments.

At a step 902, the robot begins a fully automated exploration of its surroundings from its docking station. At a step 904, an exploration tree is initiated with the starting position of the robot at as the root of the exploration tree. At a step 906, a 2D layout layer of the robot is updated according to the process described above in reference to FIGS. 1-5 (e.g., by capturing an RGB frame with a camera, using the depth perception module to determine a 3D point cloud, projecting the 3D point cloud onto a 2D mapping layer). The robot uses its fully automated exploration algorithm to select a closest point on a frontier (e.g., an edge region in the map) as its next destination. And at a step 908, a trajectory is planned between the current location of the robot and the next destination selected in the step 906. At a step 910, the robot is moved to the next destination selected in the step 906 while the robot the mapping module updates the 2D layout map and the 3D point cloud in parallel. If the mowing boundary is detected at the destination, the leaf corresponding to the location is marked as a terminal leaf.

At a step 912, a determination is made as to whether there are any unexplored leaves remaining in the exploration tree. In accordance with a determination that there are still unexplored leaves in the exploration tree, the process 900 loops back to the step 906 to continue updating the 2D mapping layer and selecting a next destination for the robot. In accordance with a determination at the step 912 that there are no further unexplored leaves in the exploration tree, the robot stops exploration at a step 914 and returns to its docking station once the entire area has been explored. In some embodiments, when the robot is a lawn mower, the robot mows the lawn while carrying out the exploration of its environment (e.g., the robot is done mowing the region when the robot is done fully exploring the region).

In a step 916, the mapping process is completed and the robot stores the updated 3D point cloud, the 2D layout layer and the mowing boundary layer. In some embodiments, the step 916 can be performed immediately after the step 910 to update the 3D point cloud/layout layer at every position traversed by the robot. In some embodiments, the 3D point cloud/layout layer is uploaded to a cloud server at the end of the process (e.g., after the robot has returned docking station.

FIG. 9B shows an example of an implementation of a fully automated planning algorithm, in accordance with some embodiments. An initial position 930 of the robot at the beginning of the exploration process is denoted as a root of an exploration tree. At each position of the robot, a portion of exploration tree is extended at the location. A particular number (e.g., eight, ten, twelve, etc.) of different leaves can be associated with a particular location. For example, eight leaves (denoted as unshaded circle) are associated with each location, as shown in FIG. 9B. One of the eight leaves is selected (denoted as a hatched circle) as the next destination of the robot. If the robot traverses to the next destination and determines that the location corresponds to a mowing boundary, the leaf corresponding to that location will be marked as a terminal leaf (e.g., a solid circle, no shown). Otherwise, a next destination will be selecting from one of the seven leaves at the new location. The robot systematically goes through each of the unexplored leaves until all the leaves are explored and/or marked as a terminal leaf. The process terminates when the entire exploration tree has been explored.

The 2D layout map is generated by elementally increasing each portion of the exploration area as shown in FIG. 9B. For example, during one observation of the robot, the region surrounding the initial position 930 is mapped. During the next observation of the robot at a next destination, the region marked 932 is mapped. The process continues until the entire region has been mapped and/or there are no more unexplored leaves in the exploration tree.

FIG. 10 is an exemplary flowchart for a process of mapping an environment surrounding a mobile robot in accordance with some embodiments. A process 1000 is optionally performed by the onboard processing units of the mobile robot, in accordance with some embodiments. In some embodiments, the process 1000 is performed by a server in communication with the mobile robot. In some embodiments, the process 1000 is performed jointly by the mobile robot and a server in communication with the mobile robot over a network. For ease of description, the steps of the process 1000 are described with respect to a mobile robot, which is non-limiting and may be understood to be performed by the server or jointly by the mobile robot and the server, in accordance with various embodiments.

As the first step, the mobile robot captures (1002), by a depth-perception device on a mobile robot moving in an environment, depth-perception information at a first location within a portion of the environment.

The mobile robot then captures (1004) by a camera device on the mobile robot, an image frame at the first location within the portion of the environment. The mobile robot generates (1006) a three-dimensional point cloud representing the portion of the environment based on the depth-perception information and the image frame. The mobile robot extracts (1008) semantic information by providing the frame and the point cloud to a neural network model configured to perform semantic segmentation. The mobile robot associates (1010) the semantic information to the three-dimensional point cloud. The mobile robot projects (1012) the three-dimensional point cloud onto a two-dimensional plane to form a first two-dimensional map. The mobile robot demarcates (1014) the first two-dimensional map with a plurality of different regions based on the semantic information.

In some embodiments, the method includes receiving, from a localization module on the mobile robot, information about a pose of the mobile robot in a world frame. The pose of the mobile robot includes a position of the mobile robot and a heading angle of the mobile robot. The method includes converting the semantic information from a camera frame into the world frame, prior to associating the semantic information to the three-dimensional point cloud.

In some embodiments, capturing the depth-perception information includes using a pair of cameras separated by baseline to capture a synchronized pair of images. In some embodiments, the image frame captured by the camera device is one image of the synchronized pair of images. In some embodiments, the neural network model is a three-dimensional semantic segmentation neural network model that includes a two-dimensional semantic segmentation module and a point-cloud semantic segmentation module. The point-cloud semantic segmentation module is configured to process the three-dimensional point cloud, and wherein the two-dimensional semantic segmentation module is configured to process the image frame.

In some embodiments, the three-dimensional point cloud does not include color or texture information. In some embodiments, the image frame includes color information. In some embodiments, the method includes using a semantic segmentation aggregator to select, for each point in the three-dimensional point cloud, a semantic segmentation result based on an output from the two-dimensional semantic segmentation module or an output from the point-cloud semantic segmentation module.

In some embodiments, projecting the three-dimensional point cloud onto the two-dimensional plane includes projecting a portion of the three-dimensional point cloud within a predefined range of height onto the two-dimensional plane. In some embodiments, the method includes receiving input from a user specifying a portion of a satellite image of the environment that defines a geofence for the mobile robot; and dividing the portion of the satellite image into a plurality of grids.

In some embodiments, the method includes selecting a second location on a frontier of the first two-dimensional map as a subsequent location for the mobile robot; planning a trajectory between the first location and the second location; moving the mobile robot to the second location; and updating the first two-dimensional map.

In some embodiments, demarcating the first two-dimensional map with the plurality of different regions based on the semantic information includes marking the first two-dimensional map with contours to form the plurality of different regions. The contours are for different types of instances extracted from semantic labeling in the semantic information.

In some embodiments, the method further includes determining a boundary based on the plurality of different regions; and in accordance with a determination that mobile robot crosses the boundary: causing the mobile robot to make an emergency stop. In some embodiments, the method includes moving the mobile robot to a second location, distinct from the first location, and generating a second two-dimensional map.

In some embodiments, the second location is on a frontier of the first two-dimensional map, and wherein the method further includes planning a trajectory between the first location and the second location; moving the robot to the second location. In some embodiments, the method includes generating a global index for each point in the three-dimensional point cloud, the global index providing information about world frame coordinates associated with the respective point in the three-dimensional point cloud, red-blue-green (RGB) values associated with the respective point, and a semantic label for the respective point.

In some embodiments, the method includes using the global index to look up points projected onto first two-dimensional map from the three-dimensional point cloud. In some embodiments, the method further includes navigating, by the mobile robot, using the first two-dimensional map; while simultaneously performing a mowing operation, wherein the mobile robot avoids obstacles demarcated in the first two-dimensional map.

In some embodiments, a mobile robot 200 (e.g., an autonomous or semi-autonomous mowing device, cleaning device, delivery device, transportation device, surveillance device, etc.) navigates in the environment (e.g., a lawn in the environment) to perform preprogrammed tasks (e.g., mowing the lawn, vacuuming/mopping the floor, performing security checks, delivering food items or medication, and/or traveling to a charging station or user-selected destination, etc.). In some embodiments, the mobile robot has onboard processing capability to process images, and uses the object semantic information to self-localize in the environment. In some embodiments, the mobile robot includes communication equipment to communication with a host device (e.g., a control station, a home station, a remote server, etc.) to transmit image data to and receive localization results from the host device. In some embodiments, the mobile robot is equipped with both a front view camera (e.g., forward facing) and a top view camera (upward facing) to capture images at different perspectives in the environment. In some embodiments, the mobile robot is further equipped with rear view camera, and/or downward view camera to capture images from different perspectives in the environment. In some embodiments, the mobile robot sends the captured images to an onboard computer (e.g., or a remote computer via wireless connection) to extract object semantic information for localization purpose (e.g., computing the robot or the robot's camera's pose in the environment). In some embodiments, the mobile robot retrieves information needed for localization from a host device, as needed. In some embodiments, some or all of the steps described with respect to the mobile robot can be performed by a host device in communication with the mobile robot. The mapping and localization process is discussed in more detail below.

FIG. 11 illustrates a block diagram of an apparatus 1100 in accordance with some embodiments. The apparatus 1100 includes a mobile robot 200, in some embodiments. In some embodiments, the apparatus 1100 includes a server in communication with the mobile robot. The apparatus 1100 is a representative of an electronic device that performs the process 1000 in FIG. 10, in accordance with some embodiments.

The apparatus 1100 includes one or more processor(s) 1102, one or more communication interface(s) 1104 (e.g., network interface(s)), memory 1106, and one or more communication buses 1108 for interconnecting these components (sometimes called a chipset).

In some embodiments, the apparatus 1100 includes input interface(s) 1110 that facilitates user input.

In some embodiments, the apparatus 1100 includes one or more camera 1118. In some embodiments, the camera 1118 is configured to capture images in color. In some embodiments, the camera 1118 is configured to capture images in black and white. In some embodiments, the camera 1118 captures images with depth information.

In some embodiments, the apparatus 1100 includes a battery 1112. The apparatus 1100 also includes sensors 1120, such as light sensor(s) 1122, pressure sensor(s) 1124, humidity sensor(s) 1126, airflow sensor(s) 1128, and/or temperature sensor(s) 1133 to facilitate tasks and operations of the mobile robot (e.g., cleaning, delivery, etc.). In some embodiments, the apparatus 1100 also includes liquid reservoir(s) 1134, agitator(s) 1136, and/or motors 1138 to execute a cleaning task (e.g., sweeping, scrubbing, mopping, etc.).

In some embodiments, the apparatus 1100 includes radios 1130. The radios 1130 enable one or more communication networks, and allow the apparatus 1100 to communicate with other devices, such as a docking station, a remote control device, a server, etc. In some implementations, the radios 1130 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.5A, WirelessHART, MiWi, Ultrawide Band (UWB), software defined radio (SDR) etc.) custom or standard wired protocols (e.g., Ethernet, HomePlug, etc.), and/or any other suitable communication protocol, including communication protocols not yet developed as of the filing date of this document.

The memory 1106 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 1106, optionally, includes one or more storage devices remotely located from one or more processor(s) 1102. The memory 1106, or alternatively the non-volatile memory within the memory 1106, includes a non-transitory computer-readable storage medium. In some implementations, the memory 1106, or the non-transitory computer-readable storage medium of the memory 1106, stores the following programs, modules, and data structures, or a subset or superset thereof:

- operating logic 1140 including procedures for handling various basic system services and for performing hardware dependent tasks;
- a communication module 1142 (e.g., a radio communication module) for connecting to and communicating with other network devices (e.g., a local network, such as a router that provides Internet connectivity, networked storage devices, network routing devices, server systems, and/or other connected devices etc.) coupled to one or more communication networks via the communication interface(s) 1104 (e.g., wired or wireless);
- application 1144 for performing tasks and self-locating, and for controlling one or more components of the apparatus 1100 and/or other connected devices in accordance with preset instructions.
- device data 1154 for the apparatus 1100, including but not limited to:
  - device settings 1156 for the apparatus 1100, such as default options for performing tasks; and
  - user settings 1158 for performing tasks;
  - sensor data 1160 that are acquired (e.g., measured) from the sensors 1120;
  - camera data 1162 that are acquired from the camera 1118; and
  - stored data 1164. For example, in some embodiments, the stored data 1164 include the semantic and feature maps of the environment, camera pose and map points of stored keyframes, etc. in accordance with some embodiments.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 1106 stores a subset of the modules and data structures identified above. Furthermore, the memory 1106 may store additional modules or data structures not described above. In some embodiments, a subset of the programs, modules, and/or data stored in the memory 1106 are stored on and/or executed by a server system, and/or by a mobile robot. Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

It will also be understood that, although the terms first, second, etc. are, in some instances, used herein to describe various elements, these elements should not be limited by these terms. These terms are only used to distinguish one element from another. For example, a first sensor could be termed a second sensor, and, similarly, a second sensor could be termed a first sensor, without departing from the scope of the various described implementations. The first sensor and the second sensor are both sensors, but they are not the same type of sensor.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated. The above clearly and completely describes the technical solutions in the embodiments of the present application with reference to the accompanying drawings in the embodiments of the present application. The described embodiments are merely a part rather than all of the embodiments of the present application. All other embodiments obtained by persons of ordinary skill in the art based on the embodiments of the present application without creative efforts shall fall within the protection scope of the present application.

What is claimed is:

1. A method, comprising:
   capturing, by a depth-perception device on a mobile robot moving in an environment, depth-perception information at a first location within a portion of the environment;
   capturing, by a camera device on the mobile robot, an image frame at the first location within the portion of the environment;

generating a three-dimensional point cloud representing the portion of the environment based on the depth-perception information and the image frame;

extracting semantic information by providing the image frame and the three-dimensional point cloud to a neural network model configured to perform semantic segmentation;

associating the semantic information to the three-dimensional point cloud;

projecting the three-dimensional point cloud onto a two-dimensional plane to form a first two-dimensional map;

demarcating the first two-dimensional map with a plurality of different regions based on the semantic information, receiving, from a localization module on the mobile robot, information about a pose of the mobile robot in a world frame, wherein the pose of the mobile robot comprises a position of the mobile robot and a heading angle of the mobile robot; and converting the semantic information from a camera frame into the world frame, prior to associating the semantic information to the three-dimensional point cloud.

2. The method of claim 1, wherein capturing the depth-perception information comprises using a pair of cameras separated by a baseline to capture a synchronized pair of images.

3. The method of claim 2, wherein the image frame captured by the camera device is one image of the synchronized pair of images.

4. The method of claim 1, wherein the neural network model is a three-dimensional semantic segmentation neural network model comprising a two-dimensional semantic segmentation module and a point-cloud semantic segmentation module, wherein the point-cloud semantic segmentation module is configured to process the three-dimensional point cloud, and wherein the two-dimensional semantic segmentation module is configured to process the image frame.

5. The method of claim 4, wherein the three-dimensional point cloud does not include color or texture information.

6. The method of claim 4, wherein the image frame includes color information.

7. The method of claim 4, further comprising using a semantic segmentation aggregator to select, for each point in the three-dimensional point cloud, a semantic segmentation result based on an output from the two-dimensional semantic segmentation module or an output from the point-cloud semantic segmentation module.

8. The method of claim 1, wherein projecting the three-dimensional point cloud onto the two-dimensional plane comprises projecting a portion of the three-dimensional point cloud within a predefined range of height onto the two-dimensional plane.

9. The method of claim 1, further comprising:
receiving input from a user specifying a portion of a satellite image of the environment that defines a geofence for the mobile robot; and
dividing the portion of the satellite image into a plurality of grids.

10. The method of claim 1, further comprising:
selecting a second location on a frontier of the first two-dimensional map as a subsequent location for the mobile robot;
planning a trajectory between the first location and the second location;
moving the mobile robot to the second location; and
updating the first two-dimensional map.

11. The method of claim 1, wherein demarcating the first two-dimensional map with the plurality of different regions based on the semantic information comprises marking the first two-dimensional map with contours to form the plurality of different regions, wherein the contours are for different types of instances extracted from semantic labeling in the semantic information.

12. The method of claim 1, further comprising:
determining a boundary based on the plurality of different regions; and
in accordance with a determination that the mobile robot crosses the boundary, causing the mobile robot to make an emergency stop.

13. The method of claim 1, further comprising moving the mobile robot to a second location, distinct from the first location, and generating a second two-dimensional map.

14. The method of claim 13, wherein the second location is on a frontier of the first two-dimensional map, and wherein the method further comprises planning a trajectory between the first location and the second location, and moving the mobile robot to the second location.

15. The method of claim 1, further comprising generating a global index for a respective point in the three-dimensional point cloud, the global index providing information about world frame coordinates associated with the respective point in the three-dimensional point cloud, red-blue-green (RGB) values associated with the respective point, and a semantic label for the respective point.

16. The method of claim 15, further comprising using the global index to look up points projected onto the first two-dimensional map from the three-dimensional point cloud.

17. The method of claim 1, further comprising navigating, by the mobile robot, using the first two-dimensional map, while simultaneously performing a mowing operation, wherein the mobile robot avoids obstacles demarcated in the first two-dimensional map.

18. An electronic device, comprising:
one or more processing units;
memory; and
a plurality of programs stored in the memory that, when executed by the one or more processing units, cause the one or more processing units to perform operations comprising:
capturing, by a depth-perception device on a mobile robot moving in an environment, depth-perception information at a first location within a portion of the environment;
capturing, by a camera device on the mobile robot, an image frame at the first location within the portion of the environment;
generating a three-dimensional point cloud representing the portion of the environment based on the depth-perception information and the image frame;
extracting semantic information by providing the image frame and the three-dimensional point cloud to a neural network model configured to perform semantic segmentation;
associating the semantic information to the three-dimensional point cloud;
projecting the three-dimensional point cloud onto a two-dimensional plane to form a first two-dimensional map;
demarcating the first two-dimensional map with a plurality of different regions based on the semantic information, receiving, from a localization module on the mobile robot, information about a pose of the mobile robot in a world frame, wherein the pose of the mobile robot comprises a position of the mobile robot and a heading angle of the mobile robot; and converting the semantic information from a camera frame into the world frame, prior to associating the semantic information to the three-dimensional point cloud.

19. A non-transitory computer readable storage medium storing a plurality of programs for execution by an electronic device having one or more processing units, wherein the plurality of programs, when executed by the one or more processing units, cause the processing units to perform operations comprising:

capturing, by a depth-perception device on a mobile robot moving in an environment, depth-perception information at a first location within a portion of the environment;

capturing, by a camera device on the mobile robot, an image frame at the first location within the portion of the environment;

generating a three-dimensional point cloud representing the portion of the environment based on the depth-perception information and the image frame;

extracting semantic information by providing the image frame and the three-dimensional point cloud to a neural network model configured to perform semantic segmentation;

associating the semantic information to the three-dimensional point cloud;

projecting the three-dimensional point cloud onto a two-dimensional plane to form a first two-dimensional map;

demarcating the first two-dimensional map with a plurality of different regions based on the semantic information, receiving, from a localization module on the mobile robot, information about a pose of the mobile robot in a world frame, wherein the pose of the mobile robot comprises a position of the mobile robot and a heading angle of the mobile robot; and converting the semantic information from a camera frame into the world frame, prior to associating the semantic information to the three-dimensional point cloud.

* * * * *